US011714629B2

(12) United States Patent
Shaastry et al.

(10) Patent No.: US 11,714,629 B2
(45) Date of Patent: Aug. 1, 2023

(54) SOFTWARE DEPENDENCY MANAGEMENT

(71) Applicant: Khoros, LLC, Austin, TX (US)

(72) Inventors: Santosh Shaastry, Bengaluru (IN); Narendra Prabhu Gurusiddappa, Mysuru (IN); Gunaalan Srinivasan, Alagappapuram (IN); Neel Millind Renavikar, Karad (IN)

(73) Assignee: Khoros, LLC, Austin, TX (US)

( * ) Notice: Subject to any disclaimer, the term of this patent is extended or adjusted under 35 U.S.C. 154(b) by 81 days.

(21) Appl. No.: 16/953,310

(22) Filed: Nov. 19, 2020

(65) Prior Publication Data

US 2022/0156053 A1    May 19, 2022

(51) Int. Cl.
| | |
|---|---|
| *G06F 8/65* | (2018.01) |
| *G06F 8/41* | (2018.01) |
| *G06F 16/2457* | (2019.01) |
| *G06F 8/75* | (2018.01) |
| *G06F 8/71* | (2018.01) |

(52) U.S. Cl.
CPC ............... *G06F 8/65* (2013.01); *G06F 8/433* (2013.01); *G06F 8/71* (2013.01); *G06F 8/75* (2013.01); *G06F 16/24578* (2019.01)

(58) Field of Classification Search
None
See application file for complete search history.

(56) References Cited

U.S. PATENT DOCUMENTS

| | | | |
|---|---|---|---|
| 5,627,764 | A | 5/1997 | Schutzman et al. |
| 6,041,311 | A | 3/2000 | Chislenko et al. |

(Continued)

FOREIGN PATENT DOCUMENTS

| | | |
|---|---|---|
| CA | 2719285 C | 8/2016 |
| CN | 102054033 A | 5/2011 |

(Continued)

OTHER PUBLICATIONS

Antoniades et al., "we.b: The web of short URLs," Apr. 2011, Proceedings of the 20th International Conference on World Wide Web, Mar. 28-Apr. 1, 2011, Hyderabad, India, pp. 715-724 (Year: 2011).

(Continued)

*Primary Examiner* — Duy Khuong T Nguyen
(74) *Attorney, Agent, or Firm* — Kokka & Backus, PC

(57) ABSTRACT

Techniques for software dependency management are described, including receiving a query at a repository configured to store a file identifying a dependency between an application and an update, the query being configured to request retrieval and implementation of the update with the application, parsing the query to identify the update and a version of the update configured to modify the application, generating a ranking associated with the update and the version using output from a machine-learning module configured to be trained against data associated with a community, and other data associated with analyzing an issue associated with the update or the version, providing a response to the query, receiving another query requesting the update or the version, retrieving the update and the version, and implementing the update or the version, the update or the version being implemented in response to the another query.

20 Claims, 10 Drawing Sheets

(56) References Cited

U.S. PATENT DOCUMENTS

| | | | |
|---|---|---|---|
| 6,146,026 A | 11/2000 | Ushiku | |
| 6,363,433 B1 | 3/2002 | Nakajima | |
| 6,385,611 B1 | 5/2002 | Cardona | |
| 6,684,239 B1 | 1/2004 | Flepp et al. | |
| 6,742,032 B1 | 5/2004 | Castellani et al. | |
| 6,871,232 B2 | 3/2005 | Curie et al. | |
| 7,031,952 B1 | 4/2006 | Heumann et al. | |
| 7,032,030 B1 | 4/2006 | Codignotto | |
| 7,130,885 B2 | 10/2006 | Chandra et al. | |
| 7,222,156 B2 | 5/2007 | Gupta et al. | |
| 7,260,610 B2 | 8/2007 | Grooters et al. | |
| 7,409,710 B1 | 8/2008 | Uchil et al. | |
| 7,519,672 B2 | 4/2009 | Boss et al. | |
| 7,590,636 B1 | 9/2009 | Heumann et al. | |
| 7,606,865 B2 | 10/2009 | Kumar et al. | |
| 7,644,057 B2 | 1/2010 | Nelken et al. | |
| 7,702,541 B2 | 4/2010 | Black et al. | |
| 7,725,492 B2 | 5/2010 | Sittig et al. | |
| 7,751,620 B1 | 7/2010 | Cosoi | |
| 7,756,926 B2 | 7/2010 | Tseng et al. | |
| 7,792,948 B2 | 9/2010 | Zhao et al. | |
| 7,818,758 B2 | 10/2010 | Bonet et al. | |
| 7,831,912 B2 | 11/2010 | King et al. | |
| 7,853,565 B1 | 12/2010 | Liskov | |
| 7,979,369 B2 | 7/2011 | Grenier et al. | |
| 8,006,187 B1 | 8/2011 | Bailey et al. | |
| 8,027,931 B2 | 9/2011 | Kalaboukis | |
| 8,082,308 B1 | 12/2011 | Filev | |
| 8,095,967 B2 | 1/2012 | Loesch et al. | |
| 8,131,745 B1 | 3/2012 | Hoffman et al. | |
| 8,171,128 B2 | 5/2012 | Zuckerberg et al. | |
| 8,200,527 B1 | 6/2012 | Thompson et al. | |
| 8,225,376 B2 | 7/2012 | Zuckerberg et al. | |
| 8,286,154 B2 | 10/2012 | Kaakani et al. | |
| 8,321,300 B1 | 11/2012 | Bockius et al. | |
| 8,412,657 B2 | 4/2013 | Grenier et al. | |
| 8,437,369 B2 | 5/2013 | Shaikli | |
| 8,505,069 B1 | 8/2013 | Solodovnikov et al. | |
| 8,606,792 B1 | 12/2013 | Jackson et al. | |
| 8,615,442 B1 | 12/2013 | Kapur et al. | |
| 8,707,297 B2 * | 4/2014 | Brown | G06F 8/65 717/178 |
| 8,738,715 B2 | 5/2014 | Roy et al. | |
| 8,744,937 B2 | 6/2014 | Seubert et al. | |
| 8,752,041 B2 | 6/2014 | Akiyoshi et al. | |
| 8,767,020 B1 | 7/2014 | Monikandan | |
| 8,769,417 B1 | 7/2014 | Robinson et al. | |
| 8,813,125 B2 | 8/2014 | Reisman | |
| 8,825,515 B1 | 9/2014 | Hanson | |
| 8,886,580 B2 | 11/2014 | Grenier et al. | |
| 8,892,524 B1 | 11/2014 | Lee et al. | |
| 8,943,069 B2 | 1/2015 | Heumann et al. | |
| 8,972,428 B2 | 3/2015 | Dicker et al. | |
| 9,021,361 B1 | 4/2015 | Pettinati et al. | |
| 9,037,735 B1 | 5/2015 | Fallows et al. | |
| 9,105,044 B2 | 8/2015 | Wu | |
| 9,131,382 B1 | 9/2015 | Johns | |
| 9,141,997 B2 | 9/2015 | Gaedcke et al. | |
| 9,143,478 B2 | 9/2015 | Ramaswamy | |
| 9,191,235 B2 | 11/2015 | Clagg et al. | |
| 9,229,702 B1 | 1/2016 | Kapulkin et al. | |
| 9,251,360 B2 | 2/2016 | Meyer et al. | |
| 9,282,098 B1 | 3/2016 | Hitchcock et al. | |
| 9,286,102 B1 | 3/2016 | Harel et al. | |
| 9,311,683 B1 | 4/2016 | Saylor et al. | |
| 9,325,696 B1 | 4/2016 | Balfanz et al. | |
| 9,338,186 B2 | 5/2016 | Wollenstein et al. | |
| 9,369,454 B2 | 6/2016 | Porzio et al. | |
| 9,378,295 B1 | 6/2016 | Marra et al. | |
| 9,483,802 B2 | 11/2016 | Gaedcke et al. | |
| 9,501,746 B2 | 11/2016 | Prakash | |
| 9,509,742 B2 | 11/2016 | Gordon | |
| 9,514,459 B1 | 12/2016 | Doshi et al. | |
| 9,519,723 B2 | 12/2016 | Lorenz et al. | |
| 9,596,206 B2 | 3/2017 | Bueno et al. | |
| 9,596,223 B1 | 3/2017 | Mezei et al. | |
| 9,619,531 B2 | 4/2017 | Wu | |
| 9,654,450 B2 | 5/2017 | Ford et al. | |
| 9,756,098 B2 | 9/2017 | Kazerani et al. | |
| 9,787,664 B1 | 10/2017 | Subbiah et al. | |
| 9,800,639 B2 | 10/2017 | Gordon | |
| 9,953,063 B2 | 4/2018 | Spasojevic et al. | |
| 10,084,838 B2 | 9/2018 | Gordon et al. | |
| 10,142,386 B2 | 11/2018 | Gordon | |
| 10,178,173 B2 | 1/2019 | Kadowaki et al. | |
| 10,180,971 B2 | 1/2019 | Bhave et al. | |
| 10,188,905 B2 | 1/2019 | Dohlen | |
| 10,204,344 B2 | 2/2019 | Gaedcke et al. | |
| 10,204,383 B2 | 2/2019 | Gaedcke et al. | |
| 10,264,042 B2 | 4/2019 | Gordon | |
| 10,264,073 B2 | 4/2019 | Kadowaki et al. | |
| 10,268,726 B1 | 4/2019 | Schiesser | |
| 10,277,928 B1 | 4/2019 | Joliveau et al. | |
| 10,277,929 B1 | 4/2019 | McLeod et al. | |
| 10,284,723 B1 | 5/2019 | Neuer, III et al. | |
| 10,346,449 B2 | 7/2019 | Senftleber et al. | |
| 10,417,180 B1 | 9/2019 | Patwardhan | |
| 10,430,894 B2 | 10/2019 | Wu | |
| 10,489,866 B2 | 11/2019 | Gaedcke et al. | |
| 10,491,490 B2 | 11/2019 | Sridhar et al. | |
| 10,497,069 B2 | 12/2019 | Gaedcke et al. | |
| 10,528,406 B2 | 1/2020 | Klemenz | |
| 10,554,697 B1 | 2/2020 | Ledet | |
| 10,560,492 B1 | 2/2020 | Ledet | |
| 10,594,773 B2 | 3/2020 | Falcao et al. | |
| 10,601,937 B2 | 3/2020 | Holzband et al. | |
| 10,613,745 B2 | 4/2020 | Mohseni | |
| 10,785,222 B2 | 9/2020 | Senftleber et al. | |
| 10,855,657 B2 | 12/2020 | Senftleber et al. | |
| 10,867,131 B2 | 12/2020 | Scott et al. | |
| 10,887,302 B2 | 1/2021 | Thakkar | |
| 10,902,462 B2 | 1/2021 | Savage et al. | |
| 10,904,639 B1 | 1/2021 | Benson et al. | |
| 10,931,540 B2 | 2/2021 | Davis et al. | |
| 10,956,459 B2 | 3/2021 | Senftleber et al. | |
| 10,999,278 B2 | 5/2021 | Senftleber et al. | |
| 11,050,704 B2 | 6/2021 | Senftleber et al. | |
| 11,061,900 B2 | 7/2021 | Falcao et al. | |
| 11,087,261 B1 | 8/2021 | Basu et al. | |
| 11,101,271 B2 | 8/2021 | Ramaswamy | |
| 11,153,726 B2 | 10/2021 | Cheung et al. | |
| 11,284,221 B2 | 3/2022 | Guo et al. | |
| 2001/0025253 A1 | 9/2001 | Heintz et al. | |
| 2001/0037469 A1 | 11/2001 | Gupta et al. | |
| 2001/0042087 A1 | 11/2001 | Kephart et al. | |
| 2001/0047290 A1 | 11/2001 | Petras et al. | |
| 2002/0010746 A1 | 1/2002 | Jilk et al. | |
| 2002/0049793 A1 | 4/2002 | Okumura et al. | |
| 2002/0070953 A1 | 6/2002 | Barg et al. | |
| 2002/0105545 A1 | 8/2002 | Carter et al. | |
| 2002/0144156 A1 | 10/2002 | Copeland | |
| 2003/0005103 A1 | 1/2003 | Narad et al. | |
| 2003/0028525 A1 | 2/2003 | Santos et al. | |
| 2003/0078959 A1 | 4/2003 | Yeung et al. | |
| 2003/0128203 A1 | 7/2003 | Marshall et al. | |
| 2003/0135565 A1 | 7/2003 | Estrada | |
| 2003/0187871 A1 | 10/2003 | Amano et al. | |
| 2003/0225850 A1 | 12/2003 | Teague | |
| 2004/0049673 A1 | 3/2004 | Song et al. | |
| 2004/0073666 A1 | 4/2004 | Foster et al. | |
| 2004/0133697 A1 | 7/2004 | Mamaghani et al. | |
| 2004/0174397 A1 | 9/2004 | Cereghini et al. | |
| 2004/0199595 A1 | 10/2004 | Banister et al. | |
| 2005/0060643 A1 | 3/2005 | Glass et al. | |
| 2005/0074126 A1 | 4/2005 | Stanko | |
| 2005/0132348 A1 | 6/2005 | Meulemans et al. | |
| 2005/0206644 A1 | 9/2005 | Kincaid | |
| 2005/0283614 A1 | 12/2005 | Hardt | |
| 2006/0010215 A1 | 1/2006 | Clegg et al. | |
| 2006/0036685 A1 | 2/2006 | Canning et al. | |
| 2006/0129602 A1 | 6/2006 | Witriol et al. | |
| 2006/0143307 A1 | 6/2006 | Codignotto | |
| 2006/0155581 A1 | 7/2006 | Eisenberger et al. | |
| 2006/0185021 A1 | 8/2006 | Dujari et al. | |

(56) References Cited

U.S. PATENT DOCUMENTS

| | | |
|---|---|---|
| 2006/0206578 A1 | 9/2006 | Heidloff et al. |
| 2006/0265740 A1 | 11/2006 | Clark et al. |
| 2006/0294196 A1 | 12/2006 | Feirouz et al. |
| 2007/0083536 A1 | 4/2007 | Darnell et al. |
| 2007/0118889 A1 | 5/2007 | Fredell |
| 2007/0136354 A1 | 6/2007 | Chen |
| 2007/0171716 A1 | 7/2007 | Wright et al. |
| 2007/0180486 A1 | 8/2007 | Yoon |
| 2007/0220029 A1 | 9/2007 | Jones et al. |
| 2007/0226177 A1 | 9/2007 | Barsness et al. |
| 2007/0240119 A1 | 10/2007 | Ducheneaut et al. |
| 2007/0282800 A1 | 12/2007 | England et al. |
| 2007/0286528 A1 | 12/2007 | Podilchuk |
| 2007/0289006 A1 | 12/2007 | Ramachandran et al. |
| 2008/0005284 A1 | 1/2008 | Ungar et al. |
| 2008/0033776 A1 | 2/2008 | Marchese |
| 2008/0034058 A1 | 2/2008 | Korman et al. |
| 2008/0040673 A1 | 2/2008 | Zuckerberg et al. |
| 2008/0103906 A1 | 5/2008 | Singh |
| 2008/0109245 A1 | 5/2008 | Gupta |
| 2008/0109491 A1 | 5/2008 | Gupta |
| 2008/0120379 A1 | 5/2008 | Malik |
| 2008/0126476 A1 | 5/2008 | Nicholas et al. |
| 2008/0133488 A1 | 6/2008 | Bandaru et al. |
| 2008/0178125 A1 | 7/2008 | Elsbree et al. |
| 2008/0189406 A1 | 8/2008 | Shen |
| 2008/0201344 A1 | 8/2008 | Levergood et al. |
| 2008/0215591 A1 | 9/2008 | Howard et al. |
| 2008/0221870 A1 | 9/2008 | Attardi et al. |
| 2008/0225848 A1 | 9/2008 | Pilon et al. |
| 2008/0263603 A1 | 10/2008 | Murray et al. |
| 2008/0294680 A1 | 11/2008 | Powell et al. |
| 2008/0306830 A1 | 12/2008 | Lasa et al. |
| 2009/0013043 A1 | 1/2009 | Tan |
| 2009/0043852 A1 | 2/2009 | Weir et al. |
| 2009/0089657 A1 | 4/2009 | Davis |
| 2009/0106080 A1 | 4/2009 | Carrier et al. |
| 2009/0132311 A1 | 5/2009 | Klinger et al. |
| 2009/0138472 A1 | 5/2009 | MacLean |
| 2009/0144723 A1 | 6/2009 | Hartin et al. |
| 2009/0157667 A1 | 6/2009 | Brougher et al. |
| 2009/0157708 A1 | 6/2009 | Bandini et al. |
| 2009/0157899 A1 | 6/2009 | Gagliardi et al. |
| 2009/0158265 A1 | 6/2009 | Davis et al. |
| 2009/0177670 A1 | 7/2009 | Grenier et al. |
| 2009/0181649 A1 | 7/2009 | Bull et al. |
| 2009/0210282 A1 | 8/2009 | Elenbaas et al. |
| 2009/0249451 A1 | 10/2009 | Su et al. |
| 2009/0292608 A1 | 11/2009 | Polachek |
| 2009/0292722 A1 | 11/2009 | Ayloo |
| 2009/0300036 A1 | 12/2009 | Nagasaki |
| 2009/0328025 A1* | 12/2009 | Johnson ............... G06F 8/71 717/170 |
| 2010/0071052 A1 | 3/2010 | Mao et al. |
| 2010/0082503 A1 | 4/2010 | Kantak et al. |
| 2010/0106730 A1 | 4/2010 | Aminian et al. |
| 2010/0119053 A1 | 5/2010 | Goeldi |
| 2010/0121707 A1 | 5/2010 | Goeldi |
| 2010/0121843 A1 | 5/2010 | Goeldi |
| 2010/0153516 A1 | 6/2010 | Weinberg et al. |
| 2010/0169148 A1 | 7/2010 | Oberhofer et al. |
| 2010/0174813 A1 | 7/2010 | Hildreth et al. |
| 2010/0205663 A1 | 8/2010 | Ward et al. |
| 2010/0211911 A1 | 8/2010 | Logan et al. |
| 2010/0223341 A1 | 9/2010 | Manolescu et al. |
| 2010/0246797 A1 | 9/2010 | Chavez et al. |
| 2010/0250683 A1 | 9/2010 | Hoyne et al. |
| 2010/0257117 A1 | 10/2010 | Shvadron et al. |
| 2010/0274732 A1 | 10/2010 | Grinchenko et al. |
| 2010/0281258 A1 | 11/2010 | Andress et al. |
| 2010/0287512 A1 | 11/2010 | Gan et al. |
| 2010/0293560 A1 | 11/2010 | Bland et al. |
| 2010/0306122 A1 | 12/2010 | Shaffer |
| 2010/0306528 A1 | 12/2010 | Andress et al. |
| 2010/0312769 A1 | 12/2010 | Bailey et al. |
| 2011/0004922 A1 | 1/2011 | Bono et al. |
| 2011/0055217 A1 | 3/2011 | Kamel et al. |
| 2011/0055264 A1 | 3/2011 | Sundelin et al. |
| 2011/0077988 A1 | 3/2011 | Cates et al. |
| 2011/0113041 A1 | 5/2011 | Hawthorne et al. |
| 2011/0119593 A1 | 5/2011 | Jacobson et al. |
| 2011/0125826 A1 | 5/2011 | Erhart et al. |
| 2011/0144801 A1 | 6/2011 | Selker et al. |
| 2011/0153603 A1 | 6/2011 | Adiba et al. |
| 2011/0196931 A1 | 8/2011 | Clagg et al. |
| 2011/0197146 A1 | 8/2011 | Goto et al. |
| 2011/0212430 A1 | 9/2011 | Smithmier et al. |
| 2011/0219087 A1 | 9/2011 | Jorasch et al. |
| 2011/0246513 A1 | 10/2011 | Covannon et al. |
| 2011/0283366 A1 | 11/2011 | Kwon et al. |
| 2011/0289574 A1 | 11/2011 | Hull et al. |
| 2011/0302653 A1 | 12/2011 | Frantz et al. |
| 2011/0320818 A1 | 12/2011 | Krishna et al. |
| 2012/0036080 A1 | 2/2012 | Singer et al. |
| 2012/0054135 A1 | 3/2012 | Salaka et al. |
| 2012/0076367 A1 | 3/2012 | Tseng |
| 2012/0077158 A1 | 3/2012 | Jastrzembski et al. |
| 2012/0089706 A1 | 4/2012 | Collins et al. |
| 2012/0095861 A1 | 4/2012 | Feng et al. |
| 2012/0102021 A1 | 4/2012 | Hill et al. |
| 2012/0117059 A1 | 5/2012 | Bailey et al. |
| 2012/0131653 A1 | 5/2012 | Pasquero et al. |
| 2012/0150759 A1 | 6/2012 | Tarjan |
| 2012/0158632 A1 | 6/2012 | Grenier et al. |
| 2012/0195422 A1 | 8/2012 | Famous |
| 2012/0198197 A1 | 8/2012 | Gladwin et al. |
| 2012/0208568 A1 | 8/2012 | Cooley |
| 2012/0210119 A1 | 8/2012 | Baxter et al. |
| 2012/0232953 A1 | 9/2012 | Custer |
| 2012/0254321 A1 | 10/2012 | Lindsay et al. |
| 2012/0265806 A1 | 10/2012 | Blanchflower et al. |
| 2012/0271729 A1 | 10/2012 | Vincelette et al. |
| 2012/0284155 A1 | 11/2012 | Holten et al. |
| 2012/0290605 A1 | 11/2012 | Ickman et al. |
| 2012/0303659 A1 | 11/2012 | Erhart et al. |
| 2012/0310942 A1 | 12/2012 | Haynes et al. |
| 2012/0317198 A1 | 12/2012 | Patton et al. |
| 2012/0331406 A1 | 12/2012 | Baird et al. |
| 2013/0006403 A1 | 1/2013 | Moore et al. |
| 2013/0007121 A1 | 1/2013 | Fontenot et al. |
| 2013/0018957 A1 | 1/2013 | Parnaby et al. |
| 2013/0024522 A1 | 1/2013 | Pierre et al. |
| 2013/0047149 A1 | 2/2013 | Xu et al. |
| 2013/0050747 A1 | 2/2013 | Cok et al. |
| 2013/0066876 A1 | 3/2013 | Raskino et al. |
| 2013/0110946 A1 | 5/2013 | Bradshaw |
| 2013/0116044 A1 | 5/2013 | Schwartz |
| 2013/0126042 A1 | 5/2013 | Dewald et al. |
| 2013/0138428 A1 | 5/2013 | Chandramouli et al. |
| 2013/0138742 A1 | 5/2013 | Dziubinski |
| 2013/0159472 A1 | 6/2013 | Newton et al. |
| 2013/0198260 A1 | 8/2013 | Dow et al. |
| 2013/0212349 A1 | 8/2013 | Maruyama |
| 2013/0218801 A1 | 8/2013 | Rago |
| 2013/0218865 A1 | 8/2013 | Angulo et al. |
| 2013/0232336 A1 | 9/2013 | Cheung et al. |
| 2013/0235069 A1 | 9/2013 | Ubillos et al. |
| 2013/0275958 A1* | 10/2013 | Ivanov ............... G06F 8/61 717/174 |
| 2013/0282417 A1 | 10/2013 | Gaedcke et al. |
| 2013/0282594 A1 | 10/2013 | Gaedcke et al. |
| 2013/0282603 A1 | 10/2013 | Gaedcke et al. |
| 2013/0282722 A1 | 10/2013 | Grenier et al. |
| 2013/0291058 A1 | 10/2013 | Wollenstein et al. |
| 2013/0298038 A1 | 11/2013 | Spivack et al. |
| 2013/0304726 A1 | 11/2013 | Sandulescu et al. |
| 2013/0304758 A1 | 11/2013 | Gruber et al. |
| 2013/0318156 A1 | 11/2013 | Friedman et al. |
| 2013/0332262 A1 | 12/2013 | Hunt et al. |
| 2013/0332263 A1 | 12/2013 | Vora et al. |
| 2013/0346872 A1 | 12/2013 | Scott et al. |
| 2014/0006524 A1 | 1/2014 | Singh et al. |
| 2014/0032306 A1 | 1/2014 | Sukornyk et al. |
| 2014/0040275 A1 | 2/2014 | Dang et al. |

(56) References Cited

U.S. PATENT DOCUMENTS

| | | |
|---|---|---|
| 2014/0040377 A1 | 2/2014 | Friedman et al. |
| 2014/0040993 A1 | 2/2014 | Lorenzo et al. |
| 2014/0047429 A1 | 2/2014 | Gaither et al. |
| 2014/0067520 A1 | 3/2014 | Campanile |
| 2014/0074844 A1 | 3/2014 | Subramanian et al. |
| 2014/0075004 A1 | 3/2014 | Dusen et al. |
| 2014/0082072 A1 | 3/2014 | Kass et al. |
| 2014/0082749 A1 | 3/2014 | Holland et al. |
| 2014/0108675 A1 | 4/2014 | Wu |
| 2014/0109205 A1 | 4/2014 | Lymer et al. |
| 2014/0164352 A1 | 6/2014 | Denninghoff |
| 2014/0173444 A1 | 6/2014 | Wu |
| 2014/0173501 A1 | 6/2014 | Wu |
| 2014/0173509 A1 | 6/2014 | Wu |
| 2014/0181087 A1 | 6/2014 | Wu |
| 2014/0181194 A1 | 6/2014 | Sullivan |
| 2014/0181728 A1 | 6/2014 | Wu |
| 2014/0184841 A1 | 7/2014 | Woo et al. |
| 2014/0189808 A1 | 7/2014 | Mahaffey et al. |
| 2014/0200989 A1 | 7/2014 | Kassko et al. |
| 2014/0222834 A1 | 8/2014 | Parikh et al. |
| 2014/0223527 A1 | 8/2014 | Bortz et al. |
| 2014/0244621 A1 | 8/2014 | Lindsay |
| 2014/0245326 A1 | 8/2014 | Kruglick |
| 2014/0278785 A1 | 9/2014 | Gaedcke et al. |
| 2014/0280113 A1 | 9/2014 | Hohwald |
| 2014/0280398 A1 | 9/2014 | Smith et al. |
| 2014/0289034 A1 | 9/2014 | Wu |
| 2014/0298199 A1 | 10/2014 | Johnson, Jr. et al. |
| 2014/0304249 A1 | 10/2014 | Ayzenshtat et al. |
| 2014/0324902 A1 | 10/2014 | Morris et al. |
| 2014/0337953 A1 | 11/2014 | Banatwala et al. |
| 2014/0358911 A1 | 12/2014 | McCarthy et al. |
| 2015/0006708 A1 | 1/2015 | Banke et al. |
| 2015/0032492 A1 | 1/2015 | Ting et al. |
| 2015/0032751 A1 | 1/2015 | Ting et al. |
| 2015/0039705 A1 | 2/2015 | Kursun |
| 2015/0067160 A1 | 3/2015 | Sridhar et al. |
| 2015/0095307 A1 | 4/2015 | Bensberg et al. |
| 2015/0100537 A1 | 4/2015 | Grieves et al. |
| 2015/0112918 A1 | 4/2015 | Zheng et al. |
| 2015/0120713 A1 | 4/2015 | Kim et al. |
| 2015/0127453 A1 | 5/2015 | Tew et al. |
| 2015/0134457 A1 | 5/2015 | Cheung et al. |
| 2015/0134579 A1 | 5/2015 | Zaman et al. |
| 2015/0142748 A1 | 5/2015 | Gottemukkula et al. |
| 2015/0161211 A1 | 6/2015 | Patel et al. |
| 2015/0170294 A1 | 6/2015 | Goyal et al. |
| 2015/0188907 A1 | 7/2015 | Khalid et al. |
| 2015/0193504 A1 | 7/2015 | Naidu et al. |
| 2015/0244706 A1 | 8/2015 | Grajek et al. |
| 2015/0281227 A1 | 10/2015 | Ivey et al. |
| 2015/0286643 A1 | 10/2015 | Kumar et al. |
| 2015/0288522 A1 | 10/2015 | McCoy et al. |
| 2015/0295869 A1 | 10/2015 | Li et al. |
| 2015/0310018 A1 | 10/2015 | Fan et al. |
| 2015/0310020 A1 | 10/2015 | Brav et al. |
| 2015/0310571 A1 | 10/2015 | Brav et al. |
| 2015/0312200 A1 | 10/2015 | Brav et al. |
| 2015/0334102 A1 | 11/2015 | Haugsnes |
| 2015/0347616 A1 | 12/2015 | Levi et al. |
| 2015/0347618 A1 | 12/2015 | Ogita |
| 2015/0381552 A1 | 12/2015 | Vijay et al. |
| 2016/0019628 A1 | 1/2016 | Udumudi et al. |
| 2016/0021097 A1 | 1/2016 | Shrotri |
| 2016/0034551 A1 | 2/2016 | Huang et al. |
| 2016/0042053 A1 | 2/2016 | Webber |
| 2016/0055250 A1 | 2/2016 | Rush |
| 2016/0055541 A1 | 2/2016 | Calistri-Yeh |
| 2016/0057576 A1 | 2/2016 | Kessler et al. |
| 2016/0073166 A1 | 3/2016 | Hu et al. |
| 2016/0080445 A1 | 3/2016 | Kazerani et al. |
| 2016/0110688 A1 | 4/2016 | Knox et al. |
| 2016/0125157 A1 | 5/2016 | Wu |
| 2016/0132904 A1 | 5/2016 | Mondal et al. |
| 2016/0132973 A1 | 5/2016 | Wu |
| 2016/0134580 A1 | 5/2016 | Castera et al. |
| 2016/0147760 A1 | 5/2016 | Anandhavelu et al. |
| 2016/0151704 A1 | 6/2016 | Wu |
| 2016/0164863 A1 | 6/2016 | Hitchcock et al. |
| 2016/0203221 A1 | 7/2016 | Rao et al. |
| 2016/0203523 A1 | 7/2016 | Spasojevic et al. |
| 2016/0210555 A1 | 7/2016 | Murphy et al. |
| 2016/0212100 A1 | 7/2016 | Banerjee |
| 2016/0255034 A1 | 9/2016 | Yuan |
| 2016/0269344 A1 | 9/2016 | Anders et al. |
| 2016/0320926 A1 | 11/2016 | Ganin et al. |
| 2016/0321261 A1 | 11/2016 | Spasojevic et al. |
| 2016/0321562 A1 | 11/2016 | Zeng |
| 2016/0321694 A1 | 11/2016 | Vorozhtsov |
| 2016/0330266 A1 | 11/2016 | Bakhmutov |
| 2016/0335572 A1 | 11/2016 | Bennett et al. |
| 2016/0345074 A1 | 11/2016 | Serbest et al. |
| 2016/0352667 A1 | 12/2016 | Pickett et al. |
| 2016/0378826 A1 | 12/2016 | Bensberg et al. |
| 2017/0012951 A1 | 1/2017 | Mennes et al. |
| 2017/0046112 A1 | 2/2017 | Keller et al. |
| 2017/0048237 A1 | 2/2017 | Pfitzmann et al. |
| 2017/0061248 A1 | 3/2017 | Ryan, Jr. et al. |
| 2017/0093839 A1 | 3/2017 | Whiteside et al. |
| 2017/0132276 A1 | 5/2017 | Saurabh et al. |
| 2017/0154356 A1 | 6/2017 | Trevisiol et al. |
| 2017/0154366 A1 | 6/2017 | Turgeman |
| 2017/0177562 A1 | 6/2017 | Scott et al. |
| 2017/0180294 A1 | 6/2017 | Milligan et al. |
| 2017/0187838 A1* | 6/2017 | Sankaranarasimhan ..................... G06F 21/31 |
| 2017/0193546 A1 | 7/2017 | Bennett et al. |
| 2017/0255536 A1 | 9/2017 | Weissinger et al. |
| 2017/0264619 A1 | 9/2017 | Narayanaswamy et al. |
| 2017/0278174 A1 | 9/2017 | Harrell |
| 2017/0300490 A1 | 10/2017 | Kachemir et al. |
| 2017/0339563 A1 | 11/2017 | Singleton, IV |
| 2017/0344748 A1 | 11/2017 | Ghani et al. |
| 2017/0366636 A1 | 12/2017 | Wang et al. |
| 2018/0027075 A1 | 1/2018 | Schoeffler et al. |
| 2018/0041336 A1 | 2/2018 | Keshava et al. |
| 2018/0053114 A1 | 2/2018 | Adjaoute |
| 2018/0081983 A1 | 3/2018 | Carru et al. |
| 2018/0089328 A1 | 3/2018 | Bath et al. |
| 2018/0091468 A1 | 3/2018 | Yong et al. |
| 2018/0097802 A1 | 4/2018 | Lander et al. |
| 2018/0115473 A1 | 4/2018 | Sridhar et al. |
| 2018/0144389 A1 | 5/2018 | Fredrich et al. |
| 2018/0152471 A1 | 5/2018 | Jakobsson |
| 2018/0211285 A1 | 7/2018 | Todasco et al. |
| 2018/0219830 A1 | 8/2018 | O'Brien et al. |
| 2018/0219849 A1 | 8/2018 | Jones et al. |
| 2018/0267951 A1 | 9/2018 | Moah et al. |
| 2018/0278503 A1 | 9/2018 | Carey et al. |
| 2018/0293607 A1 | 10/2018 | Huddleston et al. |
| 2018/0295137 A1 | 10/2018 | Zager et al. |
| 2018/0329565 A1 | 11/2018 | Yeung et al. |
| 2018/0332079 A1 | 11/2018 | Ashley et al. |
| 2018/0337871 A1 | 11/2018 | Matta et al. |
| 2018/0337907 A1 | 11/2018 | Bhansali et al. |
| 2018/0337910 A1 | 11/2018 | Gustavson et al. |
| 2018/0367484 A1 | 12/2018 | Rodriguez et al. |
| 2018/0374374 A1 | 12/2018 | Watson et al. |
| 2019/0057204 A1 | 2/2019 | Marcovecchio et al. |
| 2019/0114356 A1 | 4/2019 | Senftleber et al. |
| 2019/0116137 A1 | 4/2019 | Senftleber et al. |
| 2019/0116148 A1 | 4/2019 | Senftleber et al. |
| 2019/0129701 A1* | 5/2019 | Hawrylo ................... G06F 8/60 |
| 2019/0158610 A1 | 5/2019 | Holzband et al. |
| 2019/0159166 A1 | 5/2019 | Aggarwal et al. |
| 2019/0171753 A1 | 6/2019 | Teng et al. |
| 2019/0199711 A1 | 6/2019 | Petrovichev et al. |
| 2019/0228093 A1 | 7/2019 | Falcao et al. |
| 2019/0230151 A1 | 7/2019 | Falcao et al. |
| 2019/0245751 A1 | 8/2019 | Wong |
| 2019/0306248 A1 | 10/2019 | Swarangi et al. |
| 2019/0347984 A1 | 11/2019 | Hintermeister |
| 2019/0354709 A1 | 11/2019 | Brinskelle |

(56) References Cited

U.S. PATENT DOCUMENTS

| | | | |
|---|---|---|---|
| 2020/0007530 A1 | 1/2020 | Abdul et al. | |
| 2020/0051120 A1 | 2/2020 | Senftleber et al. | |
| 2020/0053094 A1 | 2/2020 | Kaube et al. | |
| 2020/0099676 A1 | 3/2020 | Desarda et al. | |
| 2020/0104478 A1 | 4/2020 | Chauhan | |
| 2020/0120068 A1 | 4/2020 | Senftleber et al. | |
| 2020/0120095 A1 | 4/2020 | Senftleber et al. | |
| 2020/0120096 A1 | 4/2020 | Senftleber et al. | |
| 2020/0120167 A1 | 4/2020 | Senftleber et al. | |
| 2020/0151829 A1 | 5/2020 | Wu | |
| 2020/0184575 A1 | 6/2020 | Gaedcke et al. | |
| 2020/0258091 A1 | 8/2020 | Gaedcke et al. | |
| 2020/0287957 A1 | 9/2020 | Falcao et al. | |
| 2020/0329110 A1 | 10/2020 | Holzband et al. | |
| 2020/0358755 A1 | 11/2020 | Abdul et al. | |
| 2020/0366564 A1 | 11/2020 | Davis et al. | |
| 2020/0372539 A1 | 11/2020 | Shenfeld et al. | |
| 2021/0056006 A1* | 2/2021 | Mahajan | G06F 8/427 |
| 2021/0119967 A1 | 4/2021 | Senftleber et al. | |
| 2021/0174391 A1 | 6/2021 | Savage et al. | |
| 2021/0176136 A1 | 6/2021 | Davis et al. | |
| 2021/0226952 A1 | 7/2021 | Senftleber et al. | |
| 2021/0250341 A1 | 8/2021 | Senftleber et al. | |
| 2021/0256041 A1 | 8/2021 | Senftleber et al. | |
| 2021/0328961 A1 | 10/2021 | Senftleber et al. | |
| 2021/0357408 A1 | 11/2021 | Falcao et al. | |
| 2022/0094683 A1 | 3/2022 | Bishop, III et al. | |
| 2022/0124081 A1 | 4/2022 | Gustavson et al. | |
| 2022/0166735 A1 | 5/2022 | Evans et al. | |
| 2022/0232086 A1 | 7/2022 | Holzband et al. | |

FOREIGN PATENT DOCUMENTS

| | | |
|---|---|---|
| CN | 103177095 B | 12/2015 |
| EP | 2031793 A1 | 3/2009 |
| EP | 2857993 B1 | 8/2017 |
| WO | 2009047674 A2 | 4/2009 |
| WO | 2013158839 A1 | 10/2013 |
| WO | 2014089460 A2 | 6/2014 |
| WO | 2014153463 A3 | 1/2015 |
| WO | 2015013436 A2 | 1/2015 |
| WO | 2016114841 A1 | 7/2016 |
| WO | 2019075284 A2 | 4/2019 |
| WO | 2019144159 A1 | 7/2019 |
| WO | 2020232311 A1 | 11/2020 |

OTHER PUBLICATIONS

Dinh, Khanh Q., Non-Final Office Action dated Mar. 17, 2021 for U.S. Appl. No. 16/820,697.
Dinh, Khanh Q., Notice of Allowance and Fee(s) Due dated Apr. 16, 2021 for U.S. Appl. No. 16/820,697.
Fiorillo, James N., Non-Final Office Action dated Jun. 7, 2021 for U.S. Appl. No. 16/827,625.
Frunzi, Victoria E., Final Office Action dated May 17, 2021 for U.S. Appl. No. 16/590,218.
Frunzi, Victoria E., Non-Final Office Action dated Dec. 21, 2020 for U.S. Appl. No. 16/590,218.
Goldberg, Ivan R., Final Office Action dated Jun. 29, 2021 for U.S. Appl. No. 16/695,098.
Goldberg, Ivan R., Final Office Action dated Jun. 29, 2021 for U.S. Appl. No. 16/701,143.
Goldberg, Ivan R., Non-Final Office Action dated Mar. 10, 2021 for U.S. Appl. No. 16/695,098.
Goldberg, Ivan R., Non-Final Office Action dated Mar. 3, 2021 for U.S. Appl. No. 16/701,143.
M. Rowe and H. Alani, "What Makes Communities Tick? Community Health Analysis Using Role Compositions," 2012 International Conference on Privacy, Security, Risk and Trust and 2012 International Conference on Social Computing, Amsterdam, Netherlands, 2012, pp. 267-276, doing:10.1109/SocialCom-PASSAT2012. 18.
Mesa, Joel, Notice of Allowance and Fee(s) Due dated Feb. 24, 2021 for U.S. Appl. No. 15/782,635.
Nano, Sargon N., Notice of Allowance and Fee(s) Due dated May 19, 2021 for U.S. Appl. No. 17/026,152.
Neuman, Clifford B., Proxy-Based Authorization and Accounting for Distributed Systems, IEEE 1993 (Year: 1993).
Rashid, Ishrat, Final Office Action dated Jun. 15, 2021 for U.S. Appl. No. 15/782,653.
Rashid, Ishrat, Non-Final Office Action dated Apr. 2, 2021 for U.S. Appl. No. 15/782,653.
Shaw, Robert A., Final Office Action dated Mar. 16, 2021 for U.S. Appl. No. 16/158,169.
U.S. Appl. No. 11/333,826, filed Jan. 17, 2006 and entitled, "Knowledge Filter".
U.S. Appl. No. 11/692,169, filed Mar. 27, 2007 and entitled, "Knowledge Filter".
U.S. Appl. No. 60/158,496, filed Oct. 8, 1999 and entitled, "Knowledge Filter".
U.S. Appl. No. 60/816,100, filed Jun. 22, 2006 and entitled, "Knowledge Filter".
U.S. Appl. No. 60/816,900, filed Jun. 26, 2006 and entitled, "Knowledge Filter".
"Craigslist Online Community." Craigslist.org. Jul. 6, 2010.
Ahmed, Saba, Final Office Action dated Jun. 29, 2016 for U.S. Appl. No. 14/098,492.
Ahmed, Saba, Non-Final Office Action dated Nov. 19, 2015 for U.S. Appl. No. 14/098,492.
Anicas, Mitchell; An Introduction to OAuth 2, DigitalOcean, Published Jul. 21, 2014, pp. 1-18.
Arentz et al., Classifying offensive sites based on image content, Computer Vision and Image Understanding 94, 295-310, 2004.
Bista, Sanat Kumar et al., "Using Gamification in an Online Community," CSIRO ITC Centre, Conference Paper, 2012.
Blaufeld, Justin R., Final Office Action dated Mar. 24, 2016 for U.S. Appl. No. 14/098,501.
Blaufeld, Justin R., Non-Final Office Action dated Sep. 24, 2015 for U.S. Appl. No. 14/098,501.
Bostock, Mike, Sankey Diagram, available at http://bost.ocks.org/mike/sankey, published May 21, 2012, 1 pg.
Brown Jr., Nathan H., Final Office Action dated Mar. 29, 2011 for U.S. Appl. No. 11/971,856.
Brown Jr., Nathan H., Non-Final Office Action dated Jun. 6, 2012 for U.S. Appl. No. 13/167,482.
Brown Jr., Nathan H., Non-Final Office Action dated Mar. 24, 2014 for U.S. Appl. No. 13/780,487.
Brown Jr., Nathan H., Non-Final Office Action dated Nov. 26, 2010 for U.S. Appl. No. 11/971,856.
Bui, Hanh Thi Minh, Non-Final Office Action dated Mar. 13, 2015 for U.S. Appl. No. 14/012,978.
Cannell, Larry, "Windows 7 Federated Search and SharePoint 2010" online article dated Jun. 2010 <http://blogs.gartner.com/larry-cannell/2010/09/09/windows-7-federated-search-and-sharepoint-2010/[May 13, 2016 12:36:15 PM].
Chung, Mong-Shune, Non-Final Office Action dated Jan. 29, 2016 for U.S. Appl. No. 14/098,505.
Constine, Josh, "Facebook tests notification unsubscribe button for feed posts," Aug. 9, 2010. http://www.adweek.com/socialtime/unsubscribe-button-posts/244868.
Dagnew, Saba, Final Office Action dated Feb. 12, 2020 for U.S. Appl. No. 15/581,795.
Dagnew, Saba, Non-Final Office Action for U.S. Appl. No. 15/581,795 dated Sep. 16, 2019.
Dinh, Khanh Q., Notice of Allowance and Fee(s) Due dated Oct. 29, 2019 for U.S. Appl. No. 15/877,379.
Dwyer, Cameron, "Five out-of-the-box ways to get Email into SharePoint" Jan. 2012, <https://camerondwyer.wordpress.com/2012/09/04/five-out-of-the-box-ways-to-get-email-into-sharepoint/[May 13, 2016 10:48:43 AM].
Emojipedia, (https://web.archive.org/web/20150915110235/https://emojipedia.org/fisted-hand-sign/), Date: Sep. 15, 2015; (https://web.archive.org/web/20150823012626/https://emojipedia.org/clapping-hands-sign/), Date: Aug. 23, 2015; (https://web.archive.org/web/20150829090848/https://emojipedia.org/smiling-face-with-sunglasses/), Date: Aug. 29, 2015.
Falcao et al., U.S. Appl. No. 15/877,379, filed Jan. 22, 2018 and entitled, "Temporal Optimization of Data Operations Using Distributed Search and Server Management."

(56) References Cited

OTHER PUBLICATIONS

Falcao et al., U.S. Appl. No. 15/877,381, filed Jan. 22, 2018 and entitled, "Temporal Optimization of Data Operations Using Distributed Search and Server Management."
Fett et al., The Web SSO Standard OpenID Connect: In-Depth Formal Security Analysis and Security Guidelines, 2017 IEEE 30th Computer Security Foundations Symposium (Year: 2017).
Filipczyk, Marcin R., Final Office Action dated Oct. 5, 2015 for U.S. Appl. No. 13/950,268.
Filipczyk, Marcin R., Non-Final Office Action dated Mar. 10, 2016 for U.S. Appl. No. 13/950,268.
Filipczyk, Marcin R., Non-Final Office action dated May 22, 2015 for U.S. Appl. No. 13/950,268.
Fiorillo, James N., Non-Final Office Action for U.S. Appl. No. 15/821,543 dated Aug. 16, 2019.
Fiorillo, James N., Notice of Allowance and Fee(s) Due dated Nov. 14, 2019 for U.S. Appl. No. 15/821,543.
Friedman et al., U.S. Appl. No. 61/650,849, filed May 23, 2012 and entitled, "Dynamic Information Streams in a Social Network Platform."
Frunzi, Victoria E., Non-Final Office Action dated Oct. 16, 2018 for U.S. Appl. No. 15/018,787.
Gaedckle et al., U.S. Appl. No. 61/636,132, filed Apr. 20, 2012 and entitled, "System and Method for Providing a Social Customer Care System."
Georgandellis, Andrew C., Final Office Action dated Mar. 30, 2016 for U.S. Appl. No. 13/900,878.
Georgandellis, Andrew C., Final Office Action dated Oct. 26, 2017 for U.S. Appl. No. 13/900,878.
Georgandellis, Andrew C., Final Office Action dated Sep. 21, 2016 for U.S. Appl. No. 14/035,166.
Georgandellis, Andrew C., Non-Final Office Action dated Jan. 26, 2017 for U.S. Appl. No. 13/900,878.
Georgandellis, Andrew C., Non-Final Office Action dated Jul. 11, 2016 for U.S. Appl. No. 14/035,166.
Georgandellis, Andrew C., Non-Final Office Action dated May 23, 2017 for U.S. Appl. No. 14/035,166.
Georgandellis, Andrew C., Non-Final Office Action dated Nov. 3, 2015 for U.S. Appl. No. 13/900,878.
Giphy, (https://web.archive.org/web/20140813065113/http://giphy.com/search/happy), Date: Aug. 13, 2014; https://web.archive.org/web20141231135329/https://giphy.com/upload, Date: Dec. 31, 2014; https://web.archive.org/web/20150919214012/http://giphy.com/create/upload, Date: Sep. 19, 2015.
Goldberg, Ivan R., Final Office Action dated Jan. 12, 2015 for U.S. Appl. No. 13/835,502.
Goldberg, Ivan R., Final Office Action dated Jan. 13, 2015 for U.S. Appl. No. 13/835,250.
Hashemi, Mazdak, "The Infrastructure Behind Twitter: Scale", Jan. 19, 2017, Twitter, Inc. Blog Post, https://blog.twitter.com/engineering/en_us/topics/infrastructure/2017/the-infrastructure-behind-twitter-scale.html.
Hatcher, Deirdre D., Non-Final Office Action dated Jan. 14, 2016 for U.S. Appl. No. 13/950,258.
Holzband et al., U.S. Appl. No. 15/821,543, filed Nov. 22, 2017 and entitled, "Responsive Action Prediction Based on Electronic Messages Among a System of Networked Computing Devices."
Jang, Gijeong, Written Opinion of the International Searching Authority and International Search Report dated Jul. 28, 2015 for International Patent Application No. PCT/US2014/047866.
Jou et al., "Predicting Viewer Perceived Emotions in Animated GIFs", Nov. 3-7, 2014 (4 pages).
Kim, Harry C., Notification of Transmittal of the International Search Report and the Written Opinion of the International Searching Authority, or the Declaration dated Sep. 16, 2020 for International Patent Application No. PCT/US2020/032999.
Kolosowski-Gager, Katherine, Final Office Action dated Feb. 11, 2019 for U.S. Appl. No. 14/627,151.
Kolosowski-Gager, Katherine, Non-Final Office Action dated Jun. 29, 2018 for U.S. Appl. No. 14/627,151.

Lithium Technologies. "Community Health Index for Online Communities." 2009, https://www.lithium.com/pdfs/whitepapers/Lithium-Community-Health-Index_v1AY2ULb.pdf. Retrieved from the Internet Wayback Machine, dated Feb. 19, 2011.
Lithium Website, http://www.lithium.com, Dec. 11, 2010, retrieved from Internet Archive, pp. 1-9.
Liu et al., OAuth Based Authentication and Authorization in Open Telco API; International Conference on Computer Science and Electronics Engineering, 2012 (Year: 2012).
M2 PressWire, "Alterian: Social media monitoring and analytics comes of age with Alterian's acquisition of market leader Techrigy," Jul. 15, 2009, Anonymous, Norman Media Ltd, London.
Matthews, Tara, et al. "Community Insights: Helping Community Leaders Enhance the Value of Enterprise Online Communities." Proceedings of the SIGCHI Conference on Human Factors in Computing Systems, Apr. 27-May 2, 2013, Paris, France. ACM (2013). pp. 513-522.
Meng, Jau Shya, Non-Final Office Action dated Jan. 3, 2020 for U.S. Appl. No. 15/877,381.
Meng, Jau Shya, Non-Final Office Action dated Jun. 16, 2020 for U.S. Appl. No. 15/877,381.
Mesa, Joel, Final Office Action dated Mar. 30, 2020 for U.S. Appl. No. 15/782,635.
Mesa, Joel, Non-Final Office Action for U.S. Appl. No. 15/782,635 dated Oct. 4, 2019.
Mesa, Joel, Non-Final Office Action dated Oct. 6, 2020 for U.S. Appl. No. 15/782,635.
Mosley, Kyle T., Non-Final Office Action dated Dec. 28, 2017 for U.S. Appl. No. 14/852,965.
Mosley, Kyle T., Non-Final Office Action dated Oct. 4, 2017 for U.S. Appl. No. 14/627,151.
Neizloff, Eric R., Non-Final Office Action dated Nov. 25, 2014 for U.S. Appl. No. 13/848,706.
Neizloff, Eric R., Non-Final Office Action dated Nov. 6, 2018 for U.S. Appl. No. 14/824,021.
Niruntasukrat et al., Authorization Mechanism for MQTT-based Internet of Things, IEEE ICC 2016 Workshops W07—Workshop on Convergent Internet of Things (Year: 2016).
Ofori-Awuah, Maame, Final Office Action dated Oct. 2, 2020 for U.S. Appl. No. 14/929,209.
Ofori-Awuah, Maame, Final Office Action dated Sep. 6, 2019 for U.S. Appl. No. 14/929,209.
Ofori-Awuah, Maame, Non-Final Office Action dated Apr. 5, 2019 for U.S. Appl. No. 14/929,209.
Oh, Eung Gie, Written Opinion of the International Searching Authority and International Search Report dated Nov. 18, 2014 for International Patent Application No. PCT/US2014/031345.
Olshannikov, Alex, Final Office Action dated Apr. 15, 2016 for U.S. Appl. No. 14/098,480.
Olshannikov, Alex, Final Office Action dated Feb. 17, 2016 for U.S. Appl. No. 14/098,509.
Olshannikov, Alex, Non-Final Office Action dated Nov. 5, 2015 for U.S. Appl. No. 14/098,480.
Olshannikov, Alex, Non-Final Office Action dated Oct. 22, 2015 for U.S. Appl. No. 14/098,509.
Perungavoor, Venkatanaray, Notice of Allowance and Fee(s) Due for U.S. Appl. No. 16/158,167, dated May 15, 2020.
Raju, "5 Ways to Tweet More Than 140 Characters," Dec. 28, 2008, Technically Personal, http://www.techpp.com/2008/12/28/5-ways-to-tweet-more-than-140-characters/, retrieved from Internet Archive version from Mar. 3, 2011.
Rao et al., U.S. Appl. No. 62/049,642, filed Sep. 12, 2014 and entitled, "System and Apparatus for an Application Agnostic User Search Engine."
Rashid, Ishrat, Final Office Action for U.S. Appl. No. 15/782,653 dated Sep. 19, 2019.
Rashid, Ishrat, Non-Final Office Action dated Jun. 11, 2019 for U.S. Appl. No. 15/782,653.
Rashid, Ishrat, Non-Final Office Action dated Jun. 12, 2020 for U.S. Appl. No. 15/782,653.

(56) References Cited

OTHER PUBLICATIONS

Senftleber et al., International (PCT) Patent Application No. PCT/US2018/055545, filed Oct. 12, 2018 and entitled, "Predicting Performance of Content and Electronic Messages Among a System of Networked Computing Devices."
Senftleber et al., U.S. Appl. No. 15/782,635, filed Oct. 12, 2017 and entitled, "Computerized Tools To Enhance Speed and Propagation of Content in Electronic Messages Among a System of Networked Computing Devices."
Senftleber et al., U.S. Appl. No. 15/782,642, filed Oct. 12, 2017 and entitled, "Predicting Performance of Content and Electronic Messages Among a System of Networked Computing Devices."
Senftleber et al., U.S. Appl. No. 15/782,653, filed Oct. 12, 2017 and entitled, "Optimizing Effectiveness of Content in Electronic Messages Among a System of Networked Computing Device."
Senftleber et al., U.S. Appl. No. 16/158,167, filed Oct. 11, 2018 and entitled, "Credential and Authentication Management in Scalable Data Networks."
Senftleber et al., U.S. Appl. No. 16/158,169, filed Oct. 11, 2018 and entitled, "Native Activity Tracking Using Credential and Authentication Management in Scalable Data Networks."
Senftleber et al., U.S. Appl. No. 16/158,172, filed Oct. 11, 2018 and entitled, "Proxied Multifactorauthentication Using Credential and Authentication Management in Scalable Data Networks."
Suh, Andrew, Non-Final Office Action dated Jul. 8, 2020 for U.S. Appl. No. 16/158,172.
Tabor, Amare F., Final Office Action dated Apr. 8, 2015 for U.S. Appl. No. 13/871,076.
Tabor, Amare F., Non-Final Office Action dated Aug. 15, 2014 for U.S. Appl. No. 13/871,076.
Takesue, Masaru, An HTTP Extension for Secure Transfer of Confidential Data, 2009 IEEE International Conference on Networking, Architecture, and Storage, Hunan, 2009, pp. 101-108, doi: 10.1109/NAS.2009.21.
Takesue, Masaru, An HTTP Extension for Secure Transfer of Confidential Data. IEEE, 2009 (Year: 2009).
Thomas, Shane, Written Opinion of the International Searching Authority and International Search Report dated Aug. 16, 2013 for International Patent Application No. PCT/US2013/037107.
Trapanese, William C., Non-Final Office Action dated May 27, 2020 for U.S. Appl. No. 16/413,577.
Vo, Huyen X., Non-Final Office Action dated Mar. 15, 2019 for U.S. Appl. No. 15/782,642.
Vo, Huyen X., Non-Final Office Action dated Oct. 15, 2020 for U.S. Appl. No. 16/458,183.
Walsh, John B., Non-Final Office Action dated Mar. 24, 2017 for U.S. Appl. No. 14/702,696.
Wang, Xiaoqing, and Shannon Lantzy. "A Systematic Examination of Member Turnover and Online Community Health." Thirty Second International Conference on Information Systems, Shanghai (2011), pp. 1-11.
Wollenstein et al., U.S. Appl. No. 61/639,509, filed Apr. 27, 2012 and entitled, "Systems and Methods for Implementing Custom Privacy Settings."
Wu, Michael, U.S. Appl. No. 61/734,927, filed Dec. 7, 2012 and entitled, "Systems and Methods for Presenting Analytic Data."
Wu, Michael, U.S. Appl. No. 62/072,929, filed Oct. 30, 2014 and entitled, "Systems and Methods To Monitor Health of Online Social Communities."
Young, Lee W., Notification of Transmittal of the International Search Report and the Written Opinion of the International Searching Authority, or the Declaration, dated Apr. 1, 2019 for International Application No. PCT/US2018/05545.
Young, Lee W., Written Opinion of the International Searching Authority and International Search Report dated May 28, 2014 for International Patent Application No. PCT/US2013/073625.
Young, Lee W.; Notification of Transmittal of the International Search Report and the Written Opinion of the International Searching Authority, or the Declaration dated Jun. 24, 2019 for International Application No. PCT/US2019/014637.
Goldberg, Ivan R., Final Office Action dated Jan. 15, 2015 for U.S. Appl. No. 13/865,429.
Goldberg, Ivan R., Non-Final Office Action dated Apr. 13, 2016 for U.S. Appl. No. 13/865,429.
Goldberg, Ivan R., Non-Final Office Action dated Jun. 18, 2014 for U.S. Appl. No. 13/835,250.
Goldberg, Ivan R., Non-Final Office Action dated Jun. 18, 2014 for U.S. Appl. No. 13/835,502.
Goldberg, Ivan R., Non-Final Office Action dated Jun. 20, 2014 for U.S. Appl. No. 13/865,411.
Goldberg, Ivan R., Non-Final Office Action dated Jun. 23, 2014 for U.S. Appl. No. 13/865,429.
Hardt, Dick, The OAuth 2.0 Authorization Framework draft-ietf-oauth-v2-31; Internet Engineering Task Force (IETF) (Year: 2012).
Senftleber et al., U.S. Appl. No. 16/194,126, filed Nov. 16, 2018 and entitled, "Multiplexed Data Exchange Portal Interface in Scalable Data Networks."
Shaw, Robert A., Non-Final Office Action dated Jan. 22, 2021 for U.S. Appl. No. 16/158,169.
Singh, Amardeep, IP Australia, Examination Report No. 1 for Australia Patent Application No. 2019209542 dated Dec. 17, 2020.
Spasojevic et al., U.S. Appl. No. 61/943,047, filed Feb. 21, 2014 and entitled, "Domain Generic Large Scale Topic Expertise & Interest Mining Across Multiple Online Social Networks."
Spasojevic, Nemanja et al., "When-To-Post on Social Networks", International Conference on Knowledge Discovery and Data Mining (KDD), Aug. 10-13, 2015, pp. 2127-2136, Retrieved Online: http://dl.acm.org/citation.cfm?d=2788584.
Suh, Andrew, Final Office Action dated Dec. 3, 2020 for U.S. Appl. No. 16/158,172.
Wikipedia, "Dependency Hell", published Jul. 26, 2004, Updated Oct. 14, 2020, Date Accessed: Nov. 25, 2020, <https://en.wikipedia.org/wiki/Dependency_hell> (Year: 2020).
Bendersky, Eli, "Benefits of Dependencies in Software Projects as a Function of Effort," Eli Bendersky's Website, Published Jan. 13, 2017, Date Accessed: Nov. 25, 2020, <https://eli.thegreenplace.net/2017/benefits-of-dependencies-in-software-projects-as-a-function-of-effort/>.
NPM, "Dependency Hell", New Project, Monday, Published 2016, Date Accessed: Nov. 25, 2020, <https://npm.github.io/how-npm-works-docs/theory-and-design/dependency-hell.html>.
Fia, Naya, Twitter Status, "Firefox's Dependency Graph", Published Jun. 9, 2017, Date Accessed: Nov. 25, 2020, <https://twitter.com/nayafia/status/873294386934816768>.
Dolstra, Eleco, The Purely Functional Software Deployment Model, IPA Institute for Programming Research and Algorithmics, Utrecht University, Published Jan. 18, 2006, ISBN: 90-393-4130-3, 281 Pages, Date Accessed: Nov. 25, 2020 <https://edolstra.github.io/pubs/phd-thesis.pdf>.
European Patent Office, Extended European Search Report dated Nov. 12, 2021 for European Patent Application No. 19741372.7.
Fiorillo, James N., Final Office Action dated Sep. 27, 2021 for U.S. Appl. No. 16/827,625.
Fiorillo, James N., Notice of Allowance and Fee(s) Due dated Nov. 24, 2021 for U.S. Appl. No. 16/827,625.
Leimeister et al., "Success factors of virtual communities from the perspective of members and operators: An empirical study," Proceedings of the 37th Hawaii International Conference on Systems Sciences 2004, IEEE, pp. 1-10 (Year: 2004).
Ofori-Awuah, Maame, Non-Final Office Action dated Sep. 28, 2021 for U.S. Appl. No. 14/929,209.
Rashid, Ishrat, Non-Final Office Action dated Dec. 22, 2021 for U.S. Appl. No. 15/782,653.
Shaw, Robert A., Non-Final Office Action dated Dec. 27, 2021 for U.S. Appl. No. 16/158,169.
Barua et al., "Protecting Web Browser Extensions from JavaScript Injection Attacks," 2013 International Conference on Engineering of Complex Computer Systems, IEEE. (Year: 2013).
Birgisson et al., "Macaroons: Cookies with Contextual Caveats for Decentralized Authorization in the Cloud," Network and Distributed System Security (NDSS) Symposium, Feb. 23-26, 2014, San Diego, California. (Year: 2014).

(56) References Cited

OTHER PUBLICATIONS

Dinh, Khanh Q., Non-Final Office Action dated Apr. 28, 2022 for U.S. Appl. No. 17/334,135.

Dinh, Khanh Q., Notice of Allowance and Fee(s) Due dated Jun. 29, 2022 for U.S. Appl. No. 17/334,135.

Kim, Harry, Notification of Transmittal of the International Search Report and the Written Opinion of the International Searching Authority, or the Declaration, dated Jan. 11, 2022 for International Application No. PCT/US2021/050979.

Louw et al., "Enhancing web browser security against malware extensions," J Computing Virol (2008), Published Jan. 12, 2008, Springer-Verlag France. (Year: 2008).

Meng, Jau Shya, Non-Final Office Action dated Nov. 8, 2022 for U.S. Appl. No. 17/332,391.

Mesa, Joel, Non-Final Office Action dated Mar. 31, 2022 for U.S. Appl. No. 17/244,868.

Mesa, Joel, Notice of Allowance and Fee(s) Due dated Aug. 23, 2022 for U.S. Appl. No. 17/244,868.

Nano, Sargon N., Non-Final Office Action dated Mar. 21, 2022 for U.S. Appl. No. 17/365,222.

Nano, Sargon N., Notice of Allowance and Fee(s) Due dated Apr. 28, 2022 for U.S. Appl. No. 17/365,222.

Perungavoor, Venkat, Non-Final Office Action dated Jun. 29, 2022 for U.S. Appl. No. 17/027,646.

Perungavoor, Venkatanaray, Notice of Allowance and Fee(s) Due dated Oct. 27, 2022 for U.S. Appl. No. 17/086,260.

Perungavoor, Venkatanary, Non-Final Office Action dated Aug. 19, 2022 for U.S. Appl. No. 17/086,260.

Perungavoor, Venkatanary, Non-Final Office Action dated Jun. 29, 2022 for U.S. Appl. No. 17/086,260.

Rashid, Ishrat, Notice of Allowance and Fee(s) Due, dated Sep. 16, 2022 for U.S. Appl. No. 15/782,653.

Shaw, Robert A., Notice of Allowance and Fee(s) Due dated Jun. 2, 2022 for U.S. Appl. No. 16/158,169.

Shinjo et al., A Distributed Web Browser as a Platform for Running Collaborative Applications, International Conference on Collaborative Computing: Networking, Applications and Worksharing (CollaborateCom), Orlando, Florida, USA, Oct. 15-18, 2011 (Year: 2011).

Suh, Andrew, Non-Final Office Action dated Jul. 28, 2022 for U.S. Appl. No. 17/163,293.

\* cited by examiner

SOFTWARE DEPENDENCY MANAGEMENT

FIELD

The present invention relates generally to computer science, data science, and data analytics. More specifically, techniques for software dependency management are described.

BACKGROUND

In software development where various software modules, programs, or applications are often designed, configured, and implemented to work compatibly, there is a significant and substantial problem, often referred to as "dependency hell." This is a colloquial term often used to describe costly and time-consuming activities that software developers, programmers, engineers, and architects spend finding, identifying, correcting, and fixing updates to inter-relationships often found in source code between different programs that rely upon each other to properly run (i.e., execute). These are typically referred to as "dependencies" and frequently require updating even after an initial dependency has been addressed.

Conventionally, software (regardless of whether local, remote, or distributed (e.g., cloud-based)) uses or relies upon other software to function, thus creating a dependency. When updating dependencies in source code, conventionally, application programming interfaces or other software are used to transfer data in a compatible fashion to permit interoperability. Software developers, programmers, engineers, and architects (hereafter "developers") typically manually locate updates, review data and information about prior uses of the updates (including community developer/user information or feedback), install/implement updates, and, frequently, fix or replace updates that are incompatible (i.e., erroneous).

Conventional solutions often require extensive manual work performed by a software developer to identify and configure these dependencies, which is both time consuming and expensive, but also slows application development. Dependencies are critical and vital to the design, architecture, and operation of simple and complex software that often use other elements or components such as those found in networked or cloud-based programs, applications, or platforms, many of which require specific versions in order to achieve compatibility, integrity, and operability. However, checking for dependencies and ensuring that desired versions are properly installed can, as mentioned above, be an expensive and time consuming effort leading to increased development costs, expense, and delay, which can be detrimental or harmful to end users and consumers that are increasingly using networked applications and platforms to fulfill important, if not vital, individual and organizational needs. Conventional solutions and approaches to manually updating software dependencies typically result in lost productivity, which dramatically slows design, build, and run-time cycles for software product releases. Conventional solutions lead to increased user and organizational costs and longer development cycles, which consequently hinder innovation, adoption, and successful commercialization.

Thus, what is needed is a solution for managing software dependencies, without the limitations of conventional techniques.

BRIEF DESCRIPTION OF THE DRAWINGS

Various embodiments or examples ("examples") are disclosed in the following detailed description and the accompanying drawings.

DETAILED DESCRIPTION

Figure 1:
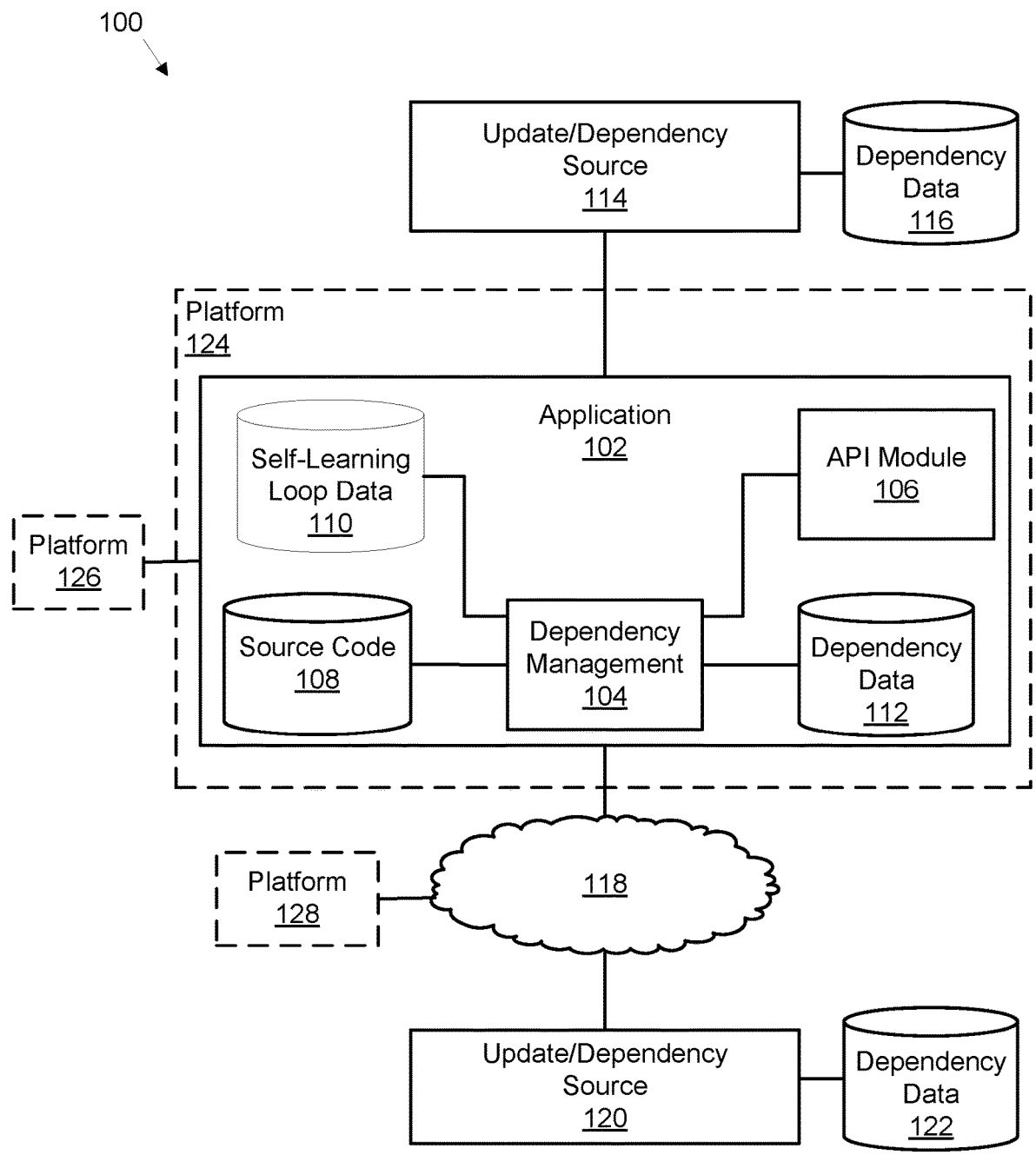
FIG. 1 illustrates an exemplary system for software dependency management.

Various embodiments or examples may be implemented in numerous ways, including as a system, a process, an apparatus, a user interface, or a series of program code or instructions on a computer readable medium such as a storage medium or a computer network including program instructions that are sent over optical, electronic, electrical, chemical, wired, or wireless communication links. In general, individual operations or sub-operations of disclosed processes may be performed in an arbitrary order, unless otherwise provided in the claims.

A detailed description of one or more examples is provided below along with accompanying figures. This detailed description is provided in connection with various examples, but is not limited to any particular example. The scope is limited only by the claims and numerous alternatives, modifications, and equivalents. Numerous specific details are set forth in the following description in order to provide a thorough understanding. These details are provided for the purpose of illustrating various examples and the described techniques may be practiced according to the claims without some or all of these specific details. For clarity, technical material that is known in the technical fields and related to the examples has not been described in detail to avoid unnecessarily obscuring the description or providing unnecessary details that may be already known to those of ordinary skill in the art.

As used herein, "system" may refer to or include the description of a computer, network, or distributed computing system, topology, or architecture using various computing resources that are configured to provide computing features, functions, processes, elements, components, or parts, without any particular limitation as to the type, make, manufacturer, developer, provider, configuration, programming or formatting language (e.g., JAVA®, JAVASCRIPT®, and others, without limitation or restriction), service, class, resource, specification, protocol, or other computing or network attributes. As used herein, "software" or "application" may also be used interchangeably or synonymously with, or refer to a computer program, software, program, firmware, or any other term that may be used to describe, reference, or refer to a logical set of instructions that, when executed, performs a function or set of functions within a computing system or machine, regardless of whether physical, logical, or virtual and without restriction or limitation to any particular implementation, design, configuration, instance, or state. Further, "platform" may refer to any type of computer hardware (hereafter "hardware") and/or software using one or more local, remote, distributed, networked, or computing cloud (hereafter "cloud")-based computing resources (e.g., computers, clients, servers, tablets, notebooks, smart phones, cell phones, mobile computing platforms or tablets, and the like) to provide an application, operating system, or other computing environment, such as those described herein, without restriction or limitation to any particular implementation, design, configuration, instance, or state. Distributed resources such as cloud computing networks (also referred to interchangeably as "computing clouds," "storage clouds," "cloud networks," or, simply, "clouds," without restriction or limitation to any particular implementation, design, configuration, instance, or state) may be used for processing and/or storage of varying quantities, types, structures, and formats of data, without restriction or limitation to any particular implementation, design, or configuration. In the drawings provided herewith, the relative sizes and shapes do not convey any limitations, restrictions, requirements, or dimensional constraints unless otherwise specified in the description and are provided for purposes of illustration only to display processes, data, data flow chart, application or program architecture or other symbols, as described in this Specification.

As described herein, structured and unstructured data may be stored in various types of data structures including, but not limited to databases, data repositories, data warehouses, data stores, or other data structures and facilities configured to manage, store, retrieve, process calls for/to, copy, modify, or delete data or sets of data (i.e., "datasets") in various computer programming languages and formats in accordance with various types of structured and unstructured database schemas and languages such as SQL®, MySQL®, NoSQL™, DynamoDB™, R, or others, such as those developed by proprietary and open source providers like Amazon® Web Services, Inc. of Seattle, Wash., Microsoft®, Oracle®, Salesforce.com, Inc., and others, without limitation or restriction to any particular schema, instance, or implementation. Further, references to databases, data structures, or any type of data storage facility may include any embodiment as a local, remote, distributed, networked, cloud-based, or combined implementation thereof, without limitation or restriction. In some examples, data may be formatted and transmitted (i.e., transferred over one or more data communication protocols) between computing resources using various types of wired and wireless data communication and transfer protocols such as Hypertext Transfer Protocol (HTTP), Transmission Control Protocol (TCP)/Internet Protocol (IP), Internet Relay Chat (IRC), SMS, text messaging, instant messaging (IM), WiFi, WiMax, or others, without limitation. Further, as described herein, disclosed processes implemented as software may be programmed using JAVA®, JAVASCRIPT®, Scala, Perl, Python™ XML, HTML, and other data formats and programming languages, without limitation. As used herein, references to layers of an application architecture (e.g., application layer or data layer) may refer to a stacked layer application architecture designed and configured using models such as the Open Systems Interconnect (OSI) model or others.

In some examples, various examples of process and apparatus-based implementations include techniques for identifying, managing, and automatically configuring dependencies, regardless of type (e.g., chained, serial, or others), in source code, without limitations or restrictions due to various types of structures, formats, or programming languages, including platforms, applications, interfaces (e.g., Application Programming Interfaces (i.e., "API's), and the like, regardless of application layer or other parameters. In some examples, the techniques may be implemented as a tool used in software development, hosted on one or more local or networked computing devices such a server, group of servers, group of logical computing resources (regardless of physical locale or geographic distribution if individual resources (e.g., servers, computers, or the like), and as single or multiple-instances using one or more processors, servers, or machines (i.e., physical or virtual) without regard to being single or multi-threaded (i.e., to permit multiple parallel instances to run/execute at substantially similar times). As used herein, described techniques may also be implemented using a local instance/implementation or a distributed topology, such as a distributed data network using resources in data connection with each other, directly or indirectly, over a network such as a computing cloud or cloud-based data network (hereafter referred to as a "cloud").

The described techniques may be implemented as a software-based application used to manage, address, resolve, upgrade, or update (hereafter "update") dependencies found in source code. In some examples, the described techniques may be used as a software development "tool" to check (i.e., manually, semi-automatically, or automatically) source code (e.g., program, platform, or application code, before or after compilation) to identify and update dependencies. For example, the described techniques may be used to check for source code dependencies between different software source code found in modules, applications, programs, platforms, or the like. As another example, the described techniques may be designed, configured, and implemented to automatically upgrade software versions of dependencies in order to achieve compatibility between different software (i.e., some software dependencies may be more compatible (i.e., having fewer or no errors after updating dependencies and compiling source code)). The described techniques may also include the use of computing logic, rules, machine learning (e.g., deep learning), and/or other algorithms configured to analyze, evaluate, learn, train, or otherwise process dependency information that is identified in source code (i.e., regardless of computing or programming language, formats, data schemas, data communication and/or transfer protocols or the like).

In some examples, dependencies can be automatically and rapidly addressed, often using suggested or recommended applications, programs, or source code that have compatible dependencies as identified by built-in logic implementing, in some examples, machine and/or deep learning algorithms.

In other examples, a software-based dependency management tool may be configured to automatically upgrade a compatible version of a dependency if, once identified, a newer or preferred version of an update is determined based on machine-learning algorithms that have been trained to identify such against prior updates. In other words, prior installed versions found to be compatible (i.e., having few or no errors when source code with updated dependencies (hereafter "updated source code) has been compiled and/or run)) may be automatically identified, retrieved, and implemented based on attributes such as compatibility. In other examples, data, metadata, and other information associated with a given implementation may be identified as attributes and stored in a data source (e.g., data repository, database, data warehouse, or any other type of data storage facility) for use in training one or more machine learning (e.g., deep learning, supervised, unsupervised, or others, without limitation or restriction) algorithms and, when (subsequent) queries are received for a similar dependency. In some examples, machine or deep learning algorithms such as those used in artificial intelligence may be used. While there is no particular dependency to a given or single machine or deep learning algorithms, there is likewise no requirement that only a single algorithm be used to implement a dependency management tool. Further, there are no restrictions or limitation as to the type of machine learning and/or deep learning algorithms used to process dependency information. As an example, machine-learning algorithms may be trained to analyze attributes of prior implementations of updates to dependencies. When a request to update a dependency is received, a machine-learning algorithm(s) as part of a self-learning loop (or module thereof) can be structured and configured to parse and evaluate a query to identify attributes for a requested update and search for matching attributes (determined from prior updates) in order to present and rank update options for a given dependency.

In other examples, the described techniques may also include processes for identifying incompatibilities between updates for dependencies. Incompatibilities may be due to errors resulting from prior updates (i.e., implementations of updates to dependencies), incompatible programming languages or formats, incongruous or incompatible data types, formats, structures, or the like, and other errors determined (i.e., identified as a result of computing operations performed to analyze data, metadata, attributes, information, or the like) from implementations of updates to software dependencies (hereafter "dependencies"). When errors are detected, various types of messages may be displayed. For example, various types of display statuses (including, but not limited to error messages) may be presented on a user interface such as "no change," "auto updated," "partial update," "partially updated," "needs attention," or others, without limitation or restriction. As another example, historical data from prior updates may be used as a data input to an instance of the described techniques as a software-based tool used to manually, semi-automatically (i.e., limited user intervention or input), or automatically manage, fix, or update (hereafter "update") dependencies between source code for different computer programs, applications, modules, or platforms (hereafter "code").

Other techniques described may be directed to "smart pull" workflow software modules that are structured (e.g., programmed) to find, retrieve, and implement updates determined based on prior pull requests, but doing so based on identifying, comparing, and matching attributes between current and prior pull requests, in order to automatically implement (i.e., include or write to code updates that address dependencies) that are determined by one or more machine-learning algorithms (trained against data of prior pull requests) to be compatible (e.g., error-free or having an error rate or number of errors below a given quantitative threshold determined by a self-learning loop module or by user input). The described techniques improve productivity (i.e., by reducing the amount of developer time spent manually identifying updates to correct dependencies by trial-and-error and without recourse for addressing incompatibilities apart from manually searching for updates) by increasing predictability, compatibility, and faster resolution of incompatible dependencies, using trained machine learning computing facilities (e.g., modules, algorithms, and the like).

In other examples, updates may be ranked by a ranking module that evaluates input data and attributes from dependency updates (i.e., "updates"). As used herein, "update" may refer to any code (e.g., source, object, or otherwise) that is used to configured, change, or modify other code and, in some examples, may have different versions, one, some, or all of which may be requested, retrieved, and implemented using the techniques described herein. In some examples, update rankings may be generated or modified by user input received at an interface (e.g., rules, thresholds, limits, restrictions, fields, attributes, or the like). In other examples, updates identified by data stored in a data source (e.g., a repository) may be identified upon receipt of a query or request for a given dependency and presented (i.e., displayed) in a user interface as ranked options for updating the dependency. In some examples, the flow of data between a machine-learning module, ranking module, a data source, and a user interface (i.e., receiving input data from a repository and providing user input to the data management tool) may be described as a self-learning loop, which may be implemented as a standalone or distributed (e.g., cloud or network-based) instance using one or more computing and networking resources. Further, a ranking module, as an element (i.e., component) of a software dependency management tool (hereafter "tool") be implemented using one or more algorithms, one or more of which may also be implemented using machine or deep learning algorithms.

In some examples, a tool using the techniques described herein can also identify and determine specific versions or builds of a given program with a compatible dependency to a software application, platform, or other instance of source code under development. If more recent versions of a given dependency (i.e., program, application, platform, or the like) is available, the techniques described herein may be implemented with a feature or functionality that can make a recommendation or suggestion (i.e., of software code that has a compatible dependency) to conform or fix code dependencies with source code under development. Ultimately, the described techniques are intended to evaluate compatibility of dependencies between different code (e.g., one computer program being dependent on another computer program) and consequently updating dependencies using self-learning loop logic such as that described herein. Regardless, the described techniques are not limited in implementation, design, function, operation, structure, configuration, specification, or other aspects and may be varied without limitation.

FIG. 1 illustrates an exemplary system for software dependency management. Here, system 100 includes application 102, dependency management module 104, application programming interface (hereafter "API") module 106, source code/data source 108, self-learning data repository 110, dependency data repository 112, update/dependency source 114, dependency data 116, network 118, update/dependency source 120, dependency data 122, and platforms 124-128. In some examples, application 102 may be designed, configured, modified, and/or used to identify and update (i.e., retrieve and install program code (e.g., source, object, or the like) for a dependency. As used herein, a "software dependency" or "dependency" may be an instance in which an application that incorporates, integrates, or uses (hereafter "uses") another program to run (i.e., compile and/or execute) and function without error or below a given threshold for errors (i.e., at an acceptable error rate) also uses a type of application (e.g., software program, computer program, program, or the like) to implement, upgrade (i.e., to a different version or build), or update (hereafter "update") the update to ensure interoperability (e.g., using code to ensure correct calls, instances, APIs, or other interconnecting software is installed in a program), consistency, continuity, and operability of the application undergoing software development.

For example, application 102, when run, may be configured to invoke dependency management module 104 to identify and update dependencies in source code (i.e., copies of which may be stored in source code repository 108) using dependency(s) retrieved from update/dependency source 114 or 120. When an update is performed, in some example, data, metadata, attributes, and information associated with the update (i.e., implementation) may be stored in dependency data 112. As shown, source code undergoing software development may be stored in a repository such as source code 108 or in a network or cloud-based repository (e.g., data storage facility, warehouse, database, or other type of repository, without limitation or restriction, including using database management systems (not shown)). In some examples, application 102 may be invoked manually (i.e., by a software developer, engineer, or other user using a graphical user interface configured to receive an input or instruction (not shown)), semi-automatically, or automatically (e.g., rules-initiated, machine or deep learning algorithmically-initiated, or others, without limitation or restriction) to identify and update dependencies between source code 108 of a given program undergoing development and another program, application, platform, or the like.

Here, application 102 may be implemented as an application, component, module, element of platform 124. In some examples, application 102 may be configured as a standalone application or tool used to identify and update software dependencies, for example, in platforms 124-128, which may be in direct (e.g., local) or indirect (e.g., using a data network or cloud such as network 118) data communication. Platforms 124-128 are shown outlined in broken line to illustrate these may be alternative implementations of operating or computing environments in which the described techniques may be implemented (e.g., application 102). In other examples, application 102 and the processes, functions, and structures described herein may be implemented differently.

In some examples, application 102 may be invoked (e.g., receive a command to run, invoke an instance, execute, or otherwise cause to operate) to identify and update dependencies within a software development project (e.g., source code 108 or other source code being written, compiled, edited, built, or other operations). As part of a software development environment or platform (e.g., platform 124-128), application 102, when invoked, may send a message, using any type of database language or format (regardless of whether a message includes an instruction to store, add, retrieve, delete, or modify structured or unstructured data) from dependency management module 104 to dependency data 112. Further, dependency management module 104 may also query self-learning loop data repository 110, which may, in some examples, invoke further modules such as machine or data learning algorithms, rules, logic, or other modules that generate data and/or signals that provide additional information that may be used by dependency management module 104 to identify, select, rank, prioritize, or perform other data operations on source code 108. Upon identifying dependencies in source code 108, dependency management module 104 may send another message, query, request, or the like (via a data communication link or module such as API module 106) to update/dependency source 114 or 120 in order to retrieve, object, or other program code to implement with source code 108. In some examples, dependency management module 104 may also send data and information via API module 106 to a user interface (not shown) providing available updates to be selected as a ranking, list, or other presentation format, without limitation or restriction. A user, in some examples, may then select an update(s) from update/dependency source 114 and/or 120 by generating and sending (e.g., transmitting) a data response or reply (hereafter "response") to dependency management module 104 identifying updates to be selected and implemented.

As described in greater detail below, updates to be presented may be ranked, listed, or otherwise presented in various types of display and presentation formats. Further, dependency management module 104 may include self-learning algorithms (e.g., machine or deep learning algorithms, neural networks, or other logic, without limitation or restriction to any particular programming language, format, schema, architecture, or types (e.g., supervised or unsupervised learning algorithms run against open, closed, or proprietary data, regression, classification, clustering, association, anomaly detection, pattern-based, or others, without limitation or restriction). In some examples, "self-learning" may also refer to any type of algorithm(s) used to implement, herein, a self-learning data processing loop module (hereafter "self-learning loop module" or "self-learning loop," which may be used interchangeably without limitation or restriction) that invokes or calls (e.g., remotely or locally) machine or deep learning algorithms such as those mentioned herein and, over a given period of time, generates results that increase or improve when performing computing tasks. Quantitative determination of increased or improved performance may be measured against a given variable or set of variables that, when measured, are used to determine a level, score, threshold, benchmark, or other quantitative determinator of "performance improvement."

Referring back to FIG. 1, once updates have been retrieved from update/dependency sources 114 and/or 120 from dependency data repositories 116 or 122, respectively, the retrieved code for the selected or identified dependencies (e.g., as determined by dependency management module 104 and selected automatically or by user input received from, for example, API module 106) may be implemented with source code 108. Update/dependency source 120 and dependency data 122 are shown as an example of an update source that may be in indirect data communication with application 102 and platform 124. Likewise, platform 118 may also be in indirect data communication with application 102 and platform 124 using, for example, a data network, computing cloud (i.e., "cloud"), local area network (LAN), wide area network (WAN), or any other data network, regardless of type, topology, data communication protocol (e.g., HTTP, TCP/IP, HTTPS, and others, without limitation or restriction). Although some modules are shown optionally implemented as a component or module of platform 124 in the described example, in other examples, one or more modules may be implemented as separate, local, remote, standalone, offsite/off-premises, or other installations that are not integrated or otherwise directly coupled to application 102. In other words, application 102 and dependency management 104 may be in data communication with one or more of source code repository 108, self-learning loop data 110, or dependency data repository 112 as remote elements, modules, repositories, applications, platforms, or systems, without limitation or restriction. For example, source code repository 108 may be an open source or public code repository such as GitHub®, acquired by Microsoft Corporation of Redmond, Wash. In still other examples, the size, shape, quantity, type, configuration, function, or structure of the elements in the exemplary system shown may be varied, without limitation or restriction.

Figure 2:
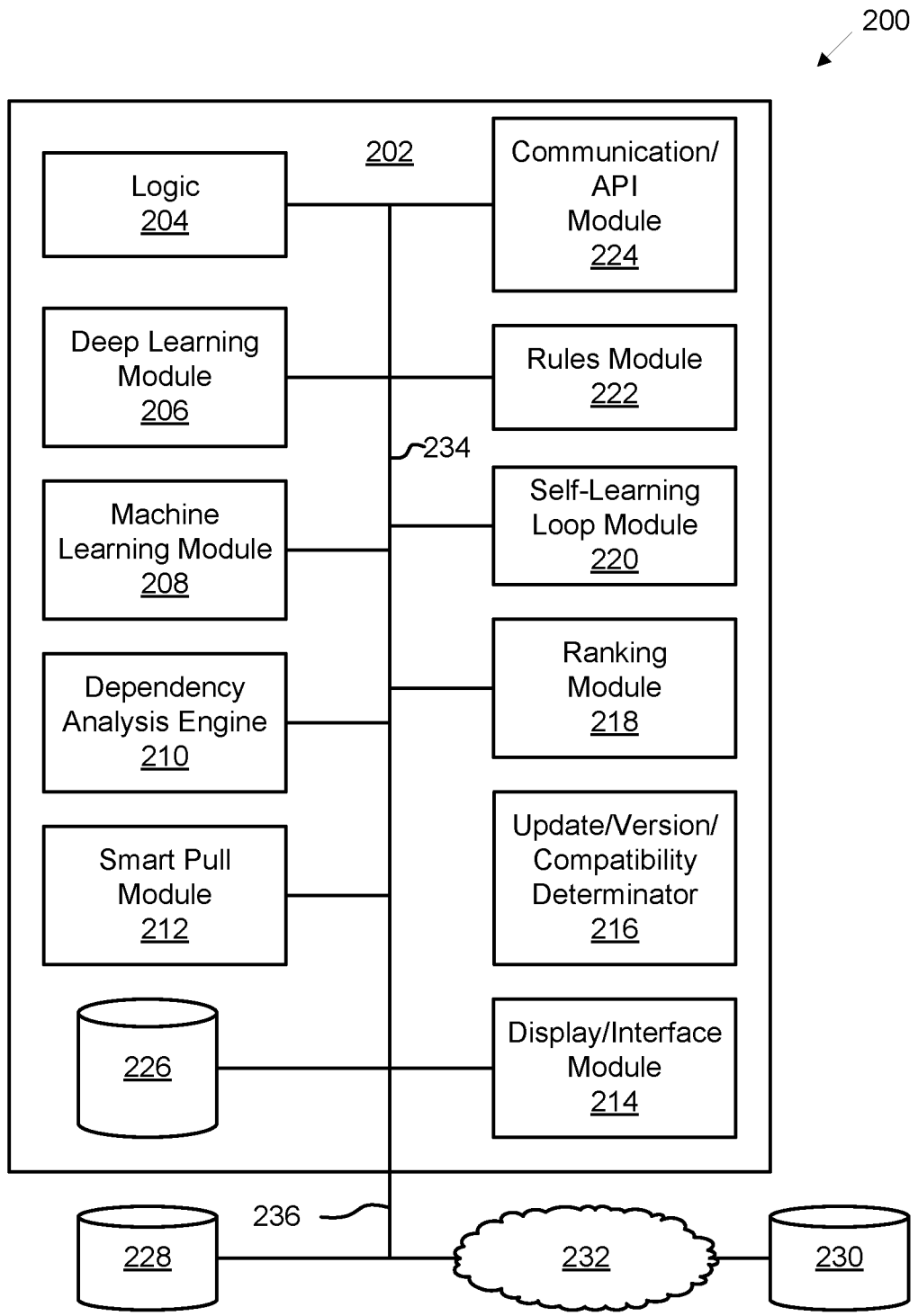
FIG. 2 illustrates an exemplary application architecture for software dependency management.

FIG. 2 illustrates an exemplary application architecture for software dependency management. Here, application 202 (which, in some examples, may be analogous in function and/or structure to application 102 (FIG. 1)) includes logic 204, deep learning module 206, machine learning module 208, dependency analysis engine 210, smart pull engine 212, display/interface module 214, update/version/compatibility determinator 216, ranking module 218, self-learning loop module 220, rules module 222, communication/API Module 224, repositories 226-230, network 232, data bus 234, and data link 236. In some examples, one or more of elements 204-224 of application 202 may transfer data, exchange signals, or otherwise be in data communication with other elements 204-224 (including repository 228 and, over network 232, repository 230). In other examples, data may be unidirectional, bidirectional, serial, parallel, or transferred using one or more data communication protocols without limitation or restriction to any particular type or instance.

As shown, application 202 may be implemented similarly in function, structure, and/or configuration to application 102 (FIG. 1) to identify and update dependencies found in software projects undergoing development. Here, logic 204 may be software or firmware implemented as a module, application, applet, script, program, or the like to generate and transfer control data and signals over data bus 234 to (internal) elements 206-226 or data communication link 236 to external elements 228-232. As show, logic 204 may be an operating system, set of rules, group of algorithms (or a single algorithm) that send data and/or signals to elements 206-226 to manage and control the identification, retrieval, and implementation of updates to source code undergoing software development (hereafter "development"). Different types of algorithms may be used to provide various functions to application 102 such as deep learning module 206, machine learning module 208, ranking module 218, and self-learning loop module 220 (described in greater detail below). As described above, various types of machine and deep learning algorithms may be used and are not limited in type, configuration, or quantity, but may be varied to implement the described techniques.

Here, dependency analysis engine 210 may be configured to evaluate a project (e.g., source code, object code, or other program code undergoing development (i.e., software development)) to identify dependencies between source code undergoing development and other software. For example, dependency analysis engine 210 may be structured as a separate, standalone application that is configured to identify dependencies by analyzing data passed through communication/API module 224, the latter of which was used in prior updates for similar or substantially similar dependencies. In some examples, dependency analysis engine 210 may also be configured to evaluate a source code project (hereafter "source code" and "project" may be used interchangeably, without limitation or restriction for all purposes within this Detailed Description) to identify dependencies and data associated with prior updates performed to other projects, including evaluating developer (i.e., users who are software developers, engineers, architects, or the like) input as to the accuracy, quality, utility, reliability, cohesion, coupling, or other attributes and characteristics associated with prior implementations of an update for a given dependency. In so doing, dependency analysis engine 210 may be in data communication (over data bus 234) with ranking module 218, cooperatively generating a ranking that may be used to sort, filter, and rank updates accordingly. In some examples, rankings may be presented on a user interface (e.g., display, presentation, or the like) by transmitting rendering and display data from display/interface module 214 to communication/API module 224 and then to one or more external displays (not shown). In other examples, rankings may be input to self-learning loop module 220, dependency analysis engine 210, or one or more of repositories 226-230, the latter of which may be any type of data storage facility, such as those described herein, and stored as "dependency data."

As an input to self-learning loop module 220, update rankings may be retrieved, requested, transmitted, transferred, or otherwise input to self-learning loop module 220, which may be configured to train machine learning algorithm(s) (e.g., machine learning module 208) and/or deep learning algorithm(s) (e.g., deep learning module 206). Machine learning module 208 and deep learning module 206, in some examples, may be trained against data and information from prior updates of source code (i.e., source code or a copy of source code under development may be stored in one or more data repositories such as a local repository (e.g., repository 226), an external repository (e.g., repository 228), or a networked repository (e.g., repository 230, which may be coupled (i.e., in data communication) via data communication link 236 to application 202. Machine learning module 208, deep learning module 206, ranking module 218, and/or rules module 222 may be called, invoked, or otherwise used by self-learning loop module 220 and update/version/compatibility determinator 216 to identify updates for various dependencies (i.e., identified by a developer or user). Update/version/compatibility determinator 216 may be implemented using different configurations to implement a sub-application or sub-tool of application 202, which is configured to evaluate an update to determine suitability for a given dependency and, if so, what version is compatible with said dependency. For example, a dependency that is based on a communication function of a project may be indicated by a developer to identify one or more updates that may be used to write source code to the overall project to fulfill the communication function or feature. Searching for updates, the update/version/compatibility determinator 216 may, in response to queries (some of which may be transmitted over communication/API module 224 to repositories 228-230), locate one or more updates stored in one or more of repositories 226-230. After or coincidental with identifying "appropriate" updates to specified (i.e., whether user or system-specified (i.e., automatic or semi-automatic)), copies of the updates may be retrieved by update/version/compatibility determinator 216. In some examples, "appropriate" may refer to a quantitative or numerical match of one or more attributes of an update for a given dependency based on evaluations performed by deep learning module 206 and/or machine learning module 208 against prior instances (i.e., installations, implementations, or uses) of similar updates or, by evaluating attributes associated with the update(s) against one or more rules (e.g., quantitative thresholds or rules) stored and managed by rules module 222 (which may also include user-specified rules provided via a user interface (not shown) to application 202 via communication/API module 224 and display/interface module 214) managed by rules module 222 and stored, in some examples, in one or more of repositories 226-230.

Here, logic 204 may be configured to send control data or signals to direct self-learning loop module 220 to update a project using the retrieved updates, using input from machine learning module 208 and/or deep learning module 206. As described here, update/version/compatibility determinator 216 may also receive input from one or more of deep learning module 206, machine learning module 208, and self-learning loop module 220 to not only identify an update, but also to identify versions and compatibility thereof. For example, update/version/compatibility determinator 216 may be configured to identify an update relative to a local copy of source code under development. Updates and local copies of source code may be stored in the same, different, or other repositories, including repositories 226-230. In some examples, update/version/compatibility determinator 216 may be an application, applet, script, or the like that is configured to determine whether a given version is compatible with code under development or, in other examples, a newer, older, or different version has a higher level of compatibility, which may be a quantitative value that is determined using various techniques such as referencing stored rules from rules module 222, input from deep learning module 206 or machine learning module 208, input from dependency analysis engine 210, ranking data from ranking module 218, and others, without limitation or restriction.

Also, in other examples, application 202 may be configured to automatically implement pull requests using smart pull engine 212, which may be configured to query, request, and retrieve data on prior pull requests from one or more of repositories 226-230. As used herein, a "pull request" may be an update that was previously committed to a local version of source code (e.g., stored in repository 226) under development, but the updates are also submitted for review and possible merging (i.e., implementation) with other copies of the same or similar source code, updates to which may be managed and maintained by another system. As shown, smart pull engine 212 may be configured to automatically search for, request, retrieve, merge, and commit pull requests for code changes performed to a project based on evaluation of prior pull requests, which may also be evaluated (similarly to updates) by deep learning module 206, machine learning module 208 and self-learning loop module 220.

Using machine, deep, or other types of algorithms, in some examples, application 202 may be configured (using dependency analysis engine 210 and self-learning loop module 220) to identify updates, evaluate compatibility of an update(s) relative to code undergoing development and modification to support or commit code changes for dependencies, which may be based on rankings from prior implementations of ranked updates, manually (e.g., presenting update rankings and receiving input from a user (i.e., developer) indicating selection of one or more updates to be installed, integrated, or otherwise written to source code under development), semi-automatically, or automatically (e.g., ranked updates, when determined, are identified in data and/or signals (e.g., voltage, current, optical, or chemical signaling) transferred to/with dependency analysis engine 210, ranking module 218, and self-learning loop module 220). Using self-learning loop module 220, code modifications and commits for dependencies can be rapidly implemented and managed by eliminating manual review and searching as well as trial-and-error implementations (hereafter "commits" and "implementations" may be used interchangeably for all purposes) of updates. In other examples, the size, shape, quantity, type, configuration, function, or structure of the elements shown in the exemplary application architecture may be varied, without limitation or restriction.

Figure 3:
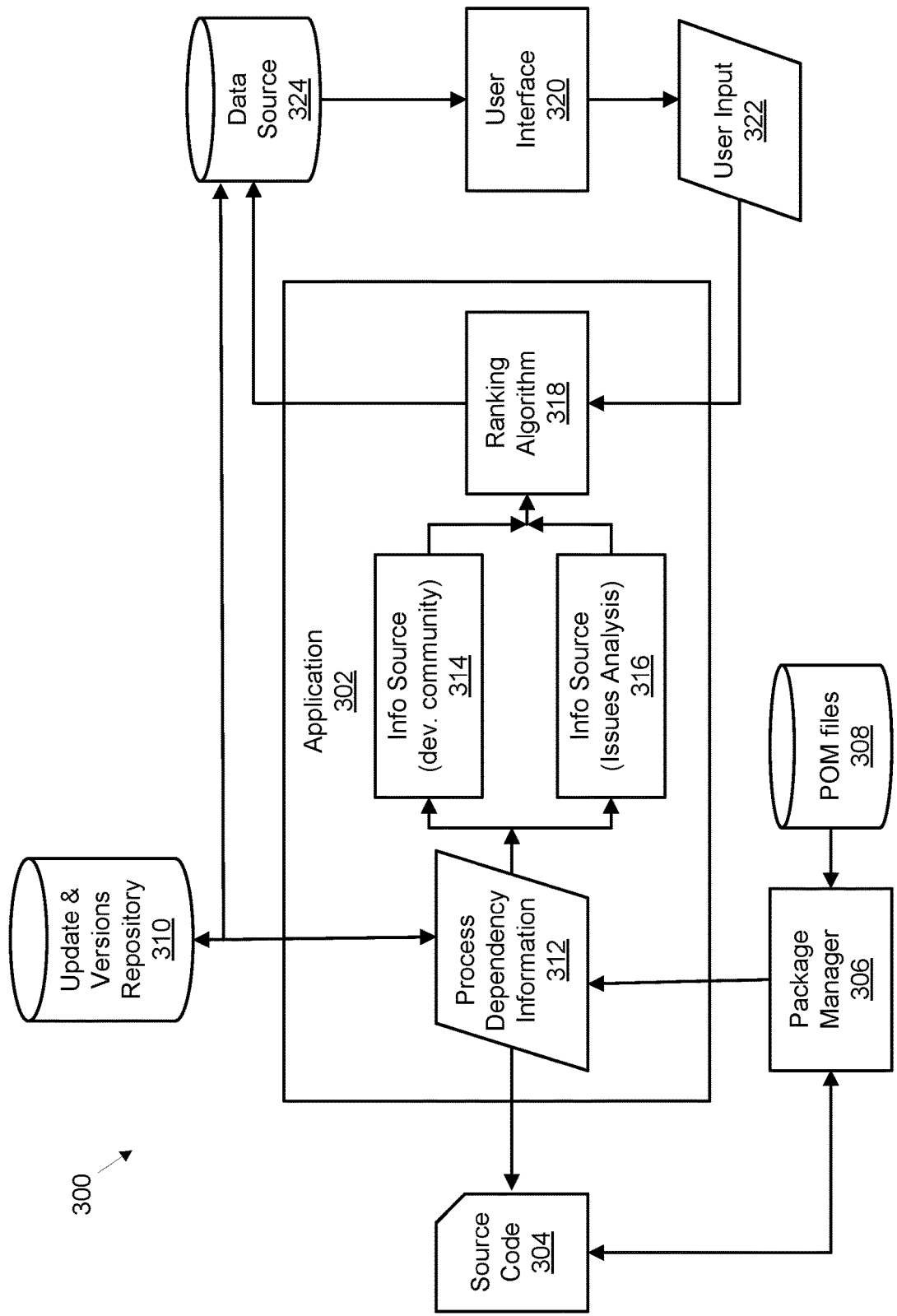
FIG. 3 illustrates an exemplary data flow process for software dependency management.

FIG. 3 illustrates an exemplary data flow process for software dependency management. Here, system 300 includes application 302, source code 304 (or a local version thereof), package manager 306, POM files 308, update and versions repository 310, process dependency information 312, information sources 314-316, ranking algorithms 318 (i.e., which may be interchangeable with ranking module 218 (FIG. 2), user interface 320, user input 322, and data source 324. In some examples, self-learning loop module 220 (FIG. 2) may be implemented using elements 318-324 as described herein. In other examples, self-learning loop module 220 (FIG. 2) may be implemented differently and is not limited to the examples provided.

Referring back to FIG. 3, application 302 is an exemplary implementation of techniques described herein for managing dependencies in software development projects. As an application, the described techniques may be implemented as a tool and structured as a standalone or sub-component, module, or element of a software development platform, configured to provide features and functionality for identifying, evaluating, updating, and improving (using self-learning techniques such as machine learning or deep learning algorithms trained against data from prior updates) updates or, in other examples, pull requests. As an example, source code 304 (or a copy thereof) may be evaluated by package manager 306, which is configured to generate and store project object model (i.e., pom files) in POM file repository 308 (e.g., POM files 308), which may be designed, configured, and implemented similar to a repository such as Apache Maven™ developed by Apache Software Foundation of Wilmington, Del., and others. In some examples, files stored in POM files 308 may be any type of file (e.g., .pom, yarn, and others, without limitation or restriction) that includes data or information describing dependencies found in source code undergoing development (e.g., source code 304). By evaluating project object model (or similar types) files from source code 304, package manager 306 can identify dependencies within a given project. When a query, request, or instruction is sent to application 302, package manager 306 can send one or more pom files included in process dependency information data files 312 from pom files repository 308 for source code 304. In other examples, update and versions repository 310 may be configured to store, retrieve, add, delete, modify, or perform other data operations (in various types of programming languages or formats, regardless of whether structured or unstructured) on updates stored therein.

Combined with data from information source 314 (e.g., stored input from a user/developer community using tools such as Stack Overflow, a collaborative, online software developer community-based platform from Stack Exchange Inc. of New York, N.Y.) and other data resulting from analyzing issues in concurrent or prior update or pull request implementations stored in information source 316, process dependency information 312 may be processed and used to rank updates by ranking algorithm 318. Rankings of updates may be performed by using process dependency information 312, data from information sources 314-316, and also from user input 322 (e.g., a user specifies a particular update and/or version thereof, an input is received from user interface 320 a given threshold (e.g., compatibility score, a quantitative threshold (e.g., percentage success rate of update, percentage failure rate, and others))) from user interface 320. In some examples, when an update is installed (i.e., commit (i.e., write operation to source code 304 ("implemented")), data, attributes, characteristics, information, and other elements associated with the commit may be stored in data source 324, which may also be used by application 302 in other updates or smart pull requests (as described in greater detail below).

In other examples, application 302 may also be referred to as a "self-learning loop" (e.g., self-learning loop module 220 (FIG. 2), and as described in greater detail), which may be implemented as a standalone program or module or integrated or incorporated as an element of another application, program, or platform. As shown, application 302 (used or referenced interchangeably in this Detailed Description with the term "self-learning loop") includes ranking algorithm 318 (which may include one or more similar or different algorithms of various types, including machine learning or deep learning algorithms configured as sub-modules of ranking algorithm 318 (e.g., deep learning module 206 (FIG. 2), machine learning module 208 (FIG. 2), and others, without limitation or restriction). Here, process dependency information 312, information sources 314-316 may be used by logic such as ranking algorithm 318 to provide a logical loop that is self-learning (e.g., uses machine or deep learning algorithms that are trained against data source 324 (or other data sources)) to identify, evaluate, and rank updates based on various attributes (which may qualitative or quantitative) such as compatibility, success/failure, commit (i.e., write) time, and others, without limitation or restriction. By using self-learned data (i.e., output from deep learning module 206 (FIG. 2) or machine learning module 208 (FIG. 2), or others) such as that generated when updates (e.g., as retrieved from update and versions repository 310) are committed to source code 304 and compiled/executed, ranking algorithm 318 can use process dependency information 312, data source 324, and information sources 314-316 to generate a list or ranking of updates to be presented on user interface 320 (with said list also being stored in data source 324). In other words, ranking algorithm 318 may be implemented with machine learning-type algorithms and software, including deep learning algorithms and other types, and trained against data (i.e., "self-learning") such as that stored in data source 324, process dependency information 312, information sources 314-316, and others. In other examples, the size, shape, quantity, type, configuration, function, or structure of the elements shown in the exemplary data flow may be varied, without limitation or restriction.

Figure 4:
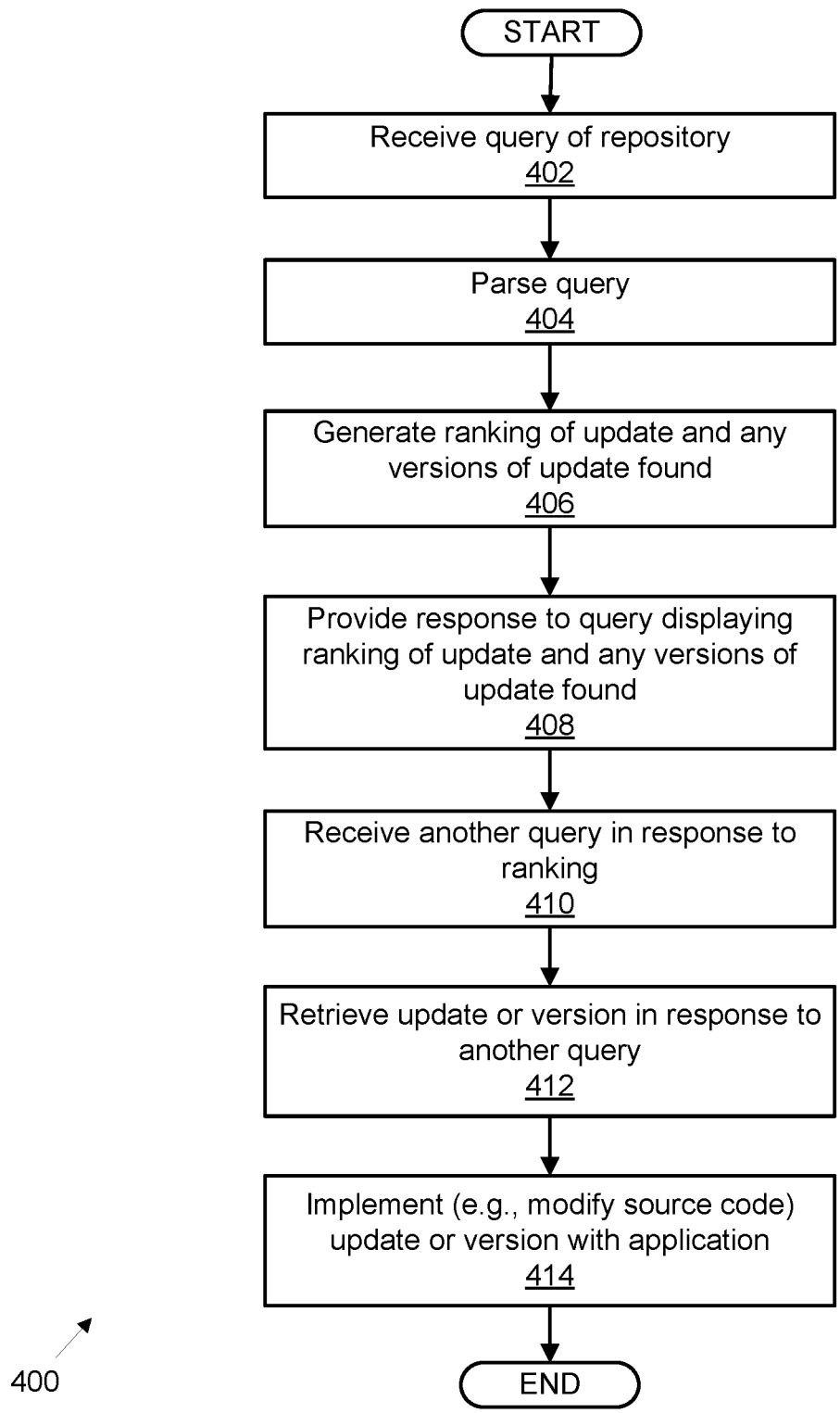
FIG. 4 illustrates an exemplary process for software dependency management.

FIG. 4 illustrates an exemplary process for software dependency management. Here, process 400 starts by receiving a query of a repository (i.e., a request for an upgrade of a given dependency as received by application 102 (FIG. 1), application 202 (FIG. 2), or as described herein) (402). Once received, the query is parsed (404). A ranking of updates identified for a given dependency and any versions thereof is generated (406). Once generated, the ranking is provided in response to the initial query, indicating updates and versions thereof (408). In further reply to the initial query, another query may be sent (i.e., from a user interface) (410). In some examples, an additional query may be an input (e.g., data or signal) received at a user interface from a user indicating selection of one or more updates to be implemented (e.g., committed, installed, written, or the like) to source code undergoing software development (e.g., source code 108 (FIG. 1), source code 304 (FIG. 3), or the like). Upon receiving, parsing, and evaluating (e.g., application 102 (FIG. 1), application 202 (FIG. 2), or the like), the additional query initiates retrieval of one or more updates in response (412). In some examples, the additional query may also be configured to identify an update and a version thereof, which may have been determined based on self-learning loop module 220 (FIG. 2) identifying a version of an update that is ranked higher than other versions based on one or more attributes (e.g., compatibility, failure, error, and other types of thresholds, rates, values, indices, or the like, without restriction or limitation). After retrieving an update and its indicated (i.e., indicated by the additional query), implementation may occur by committing or writing it to source code (e.g., source code 108 (FIG. 1), source code 304 (FIG. 3), or the like) (414). In other examples, the scope, order, configuration, function, of the elements shown in the described process may be varied, without limitation or restriction.

Figure 5:
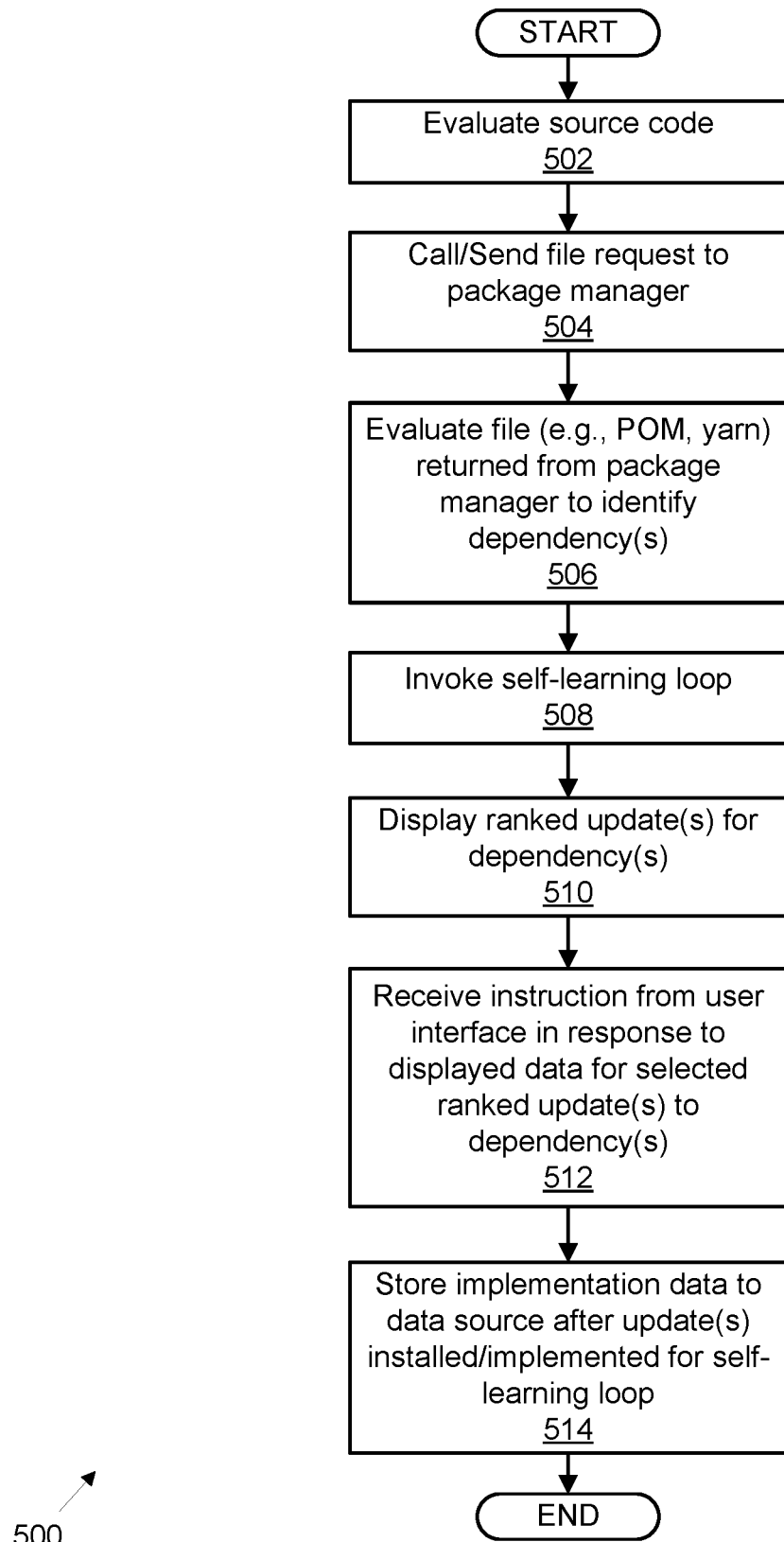
FIG. 5 illustrates another exemplary process for software dependency management.

FIG. 5 illustrates another exemplary process for software dependency management. Here, process 500 begins by evaluating source code (e.g., source code 108 (FIG. 1), source code 304 (FIG. 3), or the like) (504). Once evaluated, a call or request may be sent to a module or element configured to manage dependencies using the techniques described herein (e.g., dependency management module 104 (FIG. 1), logic 204 (FIG. 2), and others) to a package manager (e.g., package manager 306 (FIG. 3)) to retrieve a file describing dependencies in source undergoing development (504). In some examples, files requested from a package manager (e.g., package manager 306 (FIG. 3)) may be project object model, yarn, or other types of files, without limitation or restriction, such as those found in POM files 308 (FIG. 3).

Referring back to FIG. 5, once a request has been received, a response is formed including a file that is returned to the requesting source (e.g., dependency management module 104 (FIG. 1), logic 204 (FIG. 2), and others) and evaluated to identify dependency(s) in the source code undergoing development (e.g., source code 108 (FIG. 1), source code 304 (FIG. 3), or the like) (506). Once identified, a self-learning loop (e.g., dependency management module 104 and self-learning loop data 110 (FIG. 1), self-learning loop module 220 (FIG. 2), and ranking algorithm 318, user interface 320, user input 322, and data source 324 (FIG. 3), and others, without limitation or restriction) is invoked (508).

Once invoked, a self-learning loop (such as those described in this Detailed Description) may identify and rank updates (and versions thereof) for display on, for example, a user interface (e.g., user interface 320 (FIG. 3)) (510). Once displayed, a user interface may be configured to await further input that, when received, includes an instruction in response to the displayed updates and versions (or identifiers associated with each such that when a user selects an option, data or signals are transmitted from the user interface back to a ranking module (e.g., ranking algorithm 318 (FIG. 3)) as part of a self-learning loop (such as those described herein)) to select one or more of displayed, ranked updates (or versions thereof) for implementation in source code undergoing development (e.g., source code 304 (FIG. 3)) (512). Upon detecting implementation of an update (or version thereof), data associated with the implementation (e.g., data indicating that a given update or version was more compatible than another, data indicating that a given update or version was more popularly selected (despite self-learning loop-generated rankings), data indicating that a given update or version was unavailable, data indicating that a given update or version was superseded, data indicating that a given update or version was cancelled, and the like) may be stored in a data source or repository (e.g., data source 324 (FIG. 3)) and used to train logic such as machine learning algorithms, which may include other types of algorithms such as deep learning, that may be trained against data from implementations (e.g., data source 324 (FIG. 3) (514). In other examples, the scope, order, configuration, function, of the elements shown in the described process may be varied, without limitation or restriction.

Figure 6:
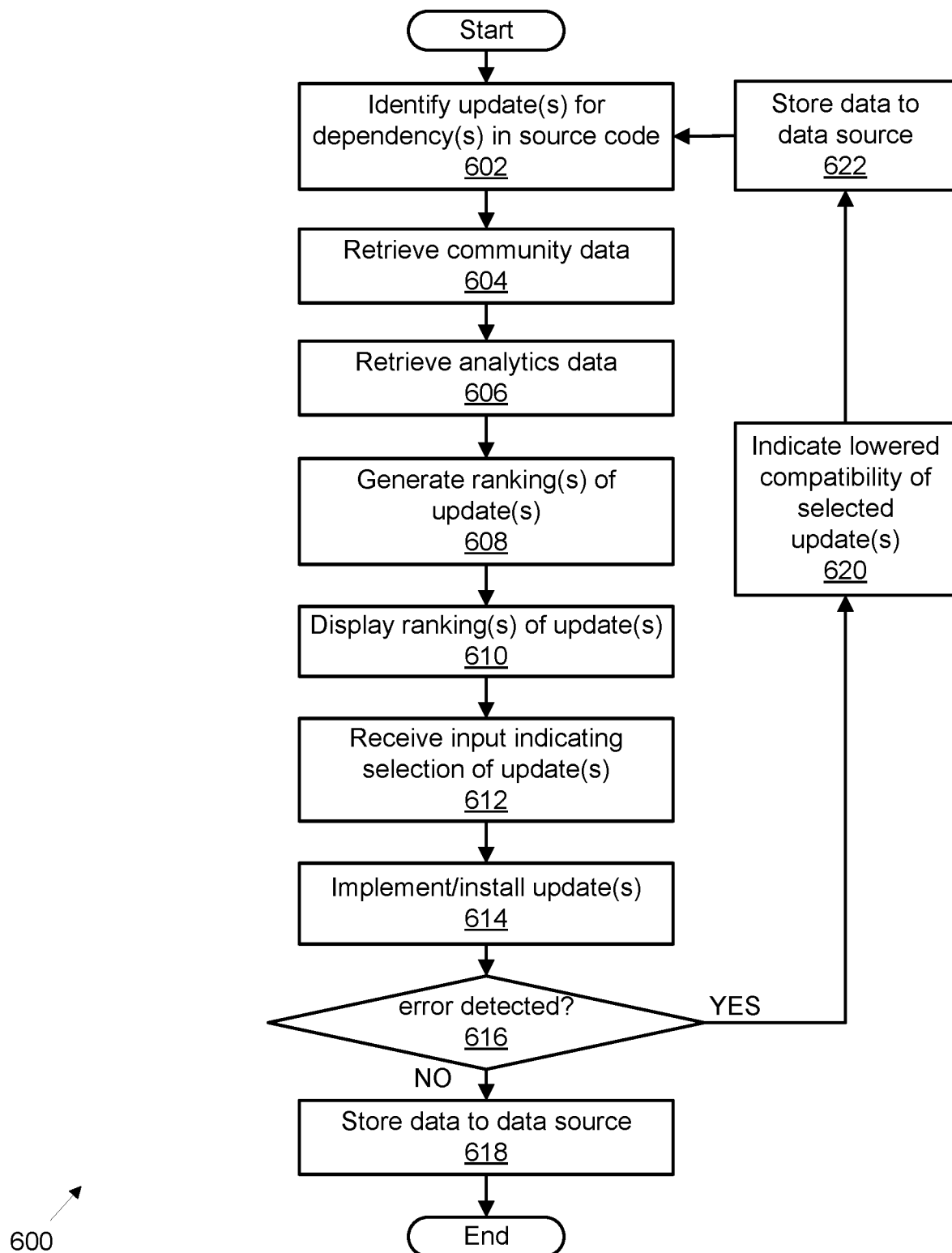
FIG. 6 illustrates an exemplary self-learning loop process for software dependency management.

FIG. 6 illustrates an exemplary self-learning loop process for software dependency management. Here, process 600 may an example of self-learning loop logic implemented by self-learning loop module 220 (FIG. 2) or as shown and described in FIG. 3. In some examples, self-learning loop logic (which may or may not be implemented as a stand-alone program, application, module, platform, or other software) starts by identifying a dependency in source code undergoing development (602). Once identified, community data (e.g., Stack Overflow™) from online software development communities, including feedback, data, attributes, and other information related to a given update or version, may be retrieved from an information source or repository (e.g., information source 314 (FIG. 3)) (606). Similarly, analytics data (i.e., data generated from analyzing issues related to the implementation of an update (or version thereof), ranging from implementation attributes (e.g., attributes related to the implementation of an update or version such as memory/storage required, update size, programming language, format, data schema, and the like, without limitation or restriction)) may also be retrieved by, for example, self-learning loop module 220 (FIG. 2) from an information source or repository (e.g., information source 316 (FIG. 3)) (606).

Using information retrieved from various repositories (e.g., data source 324 (FIG. 3), information source 314 (FIG. 3), information source 316 (FIG. 3), and others, without limitation or restriction to the examples shown and described), rankings of identified updates (and/or versions thereof) may be generated by, for example, ranking module 218 (FIG. 2), ranking algorithms 318 (FIG. 3), and others, without limitation or restriction (608). Once generated, rankings may be displayed on a user interface (e.g., user interface 320 (FIG. 3) (610).

Once displayed on user interface, rankings of updates (and/or versions thereof) may be enabled as hyperlinked or other interactive display/presentation/screen elements that, when interacted with (e.g., "clicked on"), a signal or data may be sent to self-learning loop module 220 (FIG. 2), for example, to provide an input indicating selection of an update, and/or version thereof (612). After identifying an update, implementation may occur by committing (i.e., writing) the retrieved update (and the identified version) to source code (e.g., source code 108 (FIG. 1), source code 304 (FIG. 3), or the like) (614). After implementing an update, a determination is made as to whether an error has occurred (i.e., was the implemented update compatible with the source code while also resolving the dependency) (616).

If an error is not detected, data related to the implementation may be stored to a repository such as data source 324 (FIG. 3), or the like (618). However, if the implementation of the identified, selected, and retrieved update generates an error, data related to the error (i.e., indicating lowered or non-compatibility of the update with the given source code under development) may be generated (620). The generated data of the incompatible or lowered compatibility update (and version thereof) may then be stored in a repository such as data source 324 (FIG. 3), or the like (622). Subsequently, self-learning loop logic may be enabled to repeat and await another identification of an update to a dependency to occur. In some examples, the above-described process may be performed automatically or semi-automatically in order to reduce or altogether eliminate manual intervention or input by avoiding unnecessary search and trial-and-error operations that are time consuming and costly to software development environments. In other examples, the scope, order, configuration, function, of the elements shown in the described process may be varied, without limitation or restriction.

Figure 7:
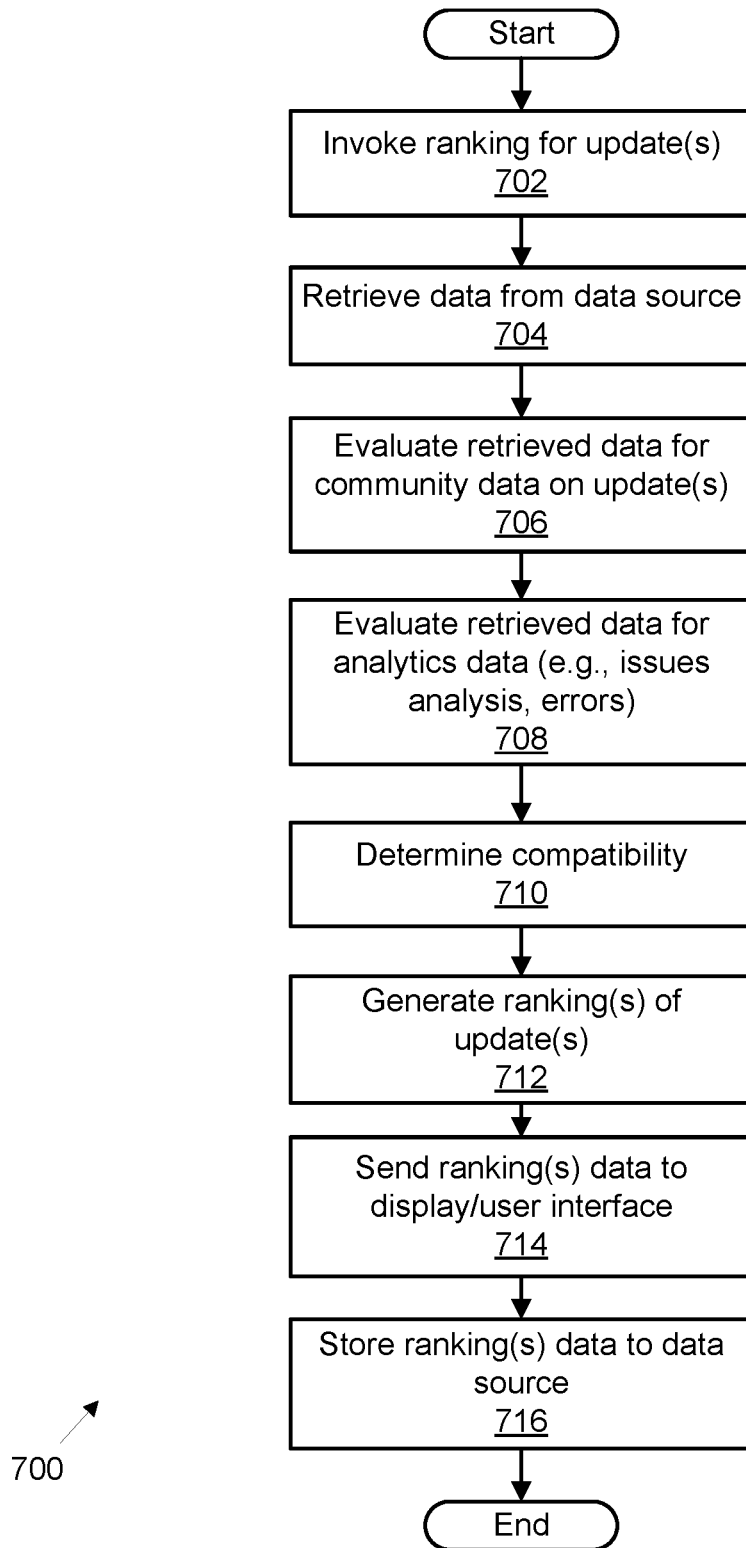
FIG. 7 illustrates an exemplary ranking process for software dependency management.

FIG. 7 illustrates an exemplary ranking process for software dependency management. Here, process 700 begins by invoking ranking module (e.g., ranking module 218 (FIG. 2)) (702). Invoking a ranking module may include invoking one or more algorithms (e.g., machine, deep, or others, without limitation or restriction) to evaluate and rank (based on user or system-specified rules that may be stored in a repository or module such as rules module 222 (FIG. 2)) updates (and/or versions thereof) that have been identified as related to or associated with a given dependency or multiple dependencies. A ranking module or process (e.g., process 700), once invoked, can retrieve data from multiple sources for use in generating rankings (704). Data such as developer community feedback or input (e.g., individual user or user groups of software developers who have used the identified update previously may provide their input via tools and platforms such as Stack Overflow™, copies of which may also be stored in a repository(s) such as information source 314 (FIG. 3)), analytics data (e.g., information source 316 (FIG. 3)) generated from evaluating or analyzing issues associated with prior implementations of a selected update, and others may be retrieved and evaluated to generate rankings. Data analyzed from developer community feedback or input may be evaluated (706) as well as data resulting from analyzing issues associated with prior implementations (i.e., issues analysis) (708).

In some examples, after evaluating dependency data (e.g., update and versions repository 310 (FIG. 3), process dependency information 312 (FIG. 3), data source 324 (FIG. 3), and the like), community developer feedback and input (e.g., information source 314 (FIG. 3)), and issues analysis data (e.g., information source 316 (FIG. 3)), a determination may be made as to compatibility of a given update for a particular dependency found (i.e., identified) in source code under development (e.g., source code 304 (FIG. 3, and others) (710). Compatibility may encompass a wide range of attributes, variables, selection criteria (e.g., criteria that may be user or system-specified that provides parameters, requirements, limitations, and/or restrictions that determine what updates are available for identification as appropriate updates for particular dependencies), characteristics, and other data that enable a self-learning loop (e.g., self-learning loop module 220 (FIG. 2), and others as described herein) to rank updates identified for given dependencies. Based on the above determinations, a ranking is generated that lists updates (and/or versions thereof) that are available for selection (712). Once identified, ranking data may be transferred from a ranking process (e.g., ranking module 222 (FIG. 2), ranking algorithm(s) 318 (FIG. 3), and the like) to a user interface (e.g., user interface 320 (FIG. 3), and the like) for display/presentation to a user (714). Further, ranking data may also be stored for use in future searches or processes that are instantiated or invoked to identify updates (and/or versions thereof) for a given dependency (716). In other examples, the size, shape, quantity, type, configuration, function, or structure of the elements shown in the described process may be varied, without limitation or restriction.

Figure 8A:
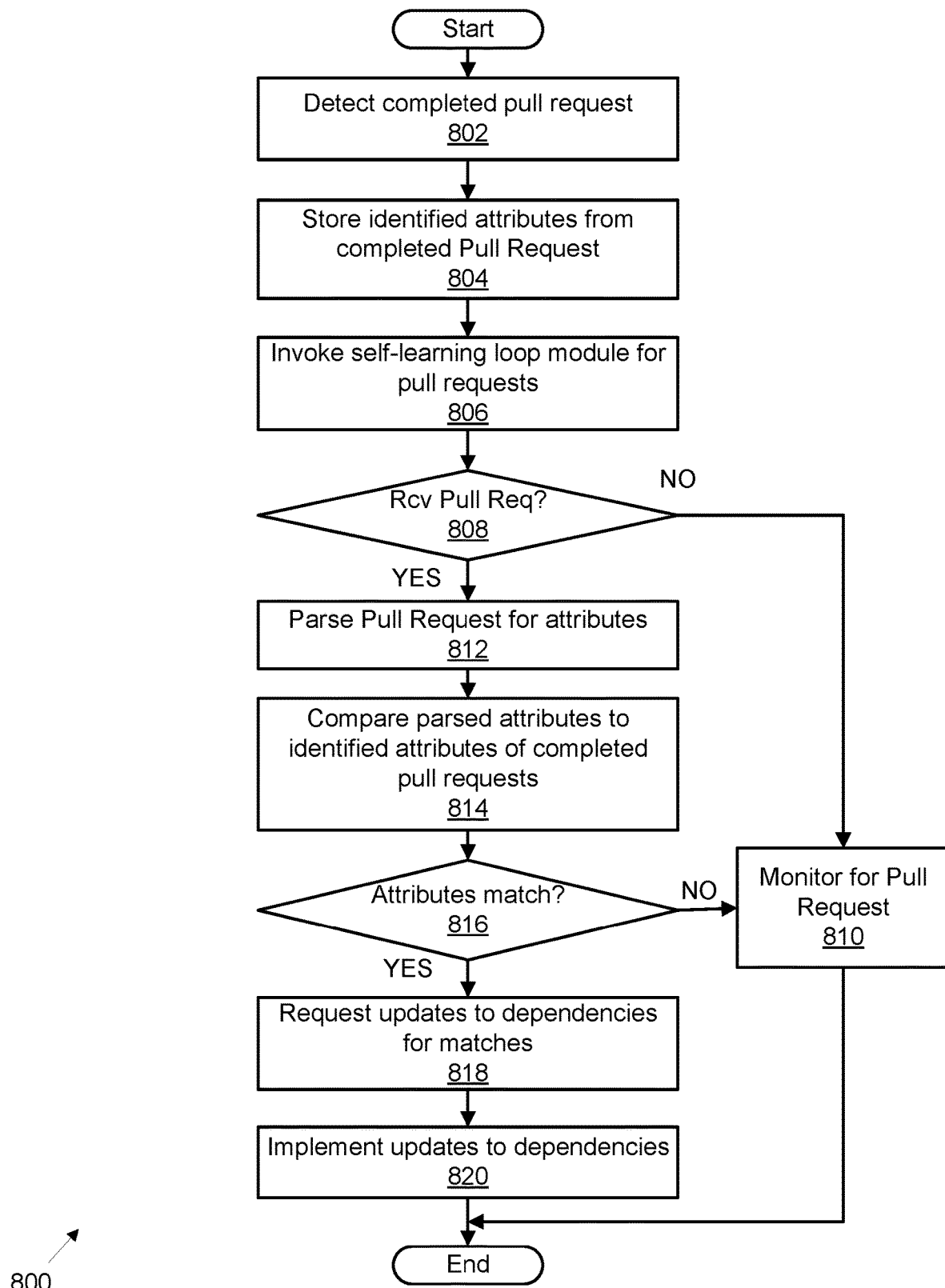
FIG. 8A illustrates an exemplary smart pull process for software dependency management.

FIG. 8A illustrates an exemplary smart pull process for software dependency management. Here, process 800 begins by detecting a pull request (802). Identified attributes (e.g., any type of data associated with a completed pull request) of the detected pull request are stored in one or more repositories or other type of data storage facility (e.g., dependency data 112, 116, 122 (FIG. 1), repositories 226-230 (FIG. 2), data source 324 (FIG. 3), or the like) (804). Next, a self-learning loop is invoked to identify, request, select, or rank completed pull requests (i.e., previously-performed/completed/committed pull requests may have data such as associated attributes and characteristics (i.e., "pull request data") that are stored in a repository (e.g., data source 324 (FIG. 3) and self-learning loop module 220 (FIG. 2), which may be configured to request/retrieve stored pull request data) (806). Pull requests, as described herein, includes updates, modifications, or changes made to source code (e.g., source code 304 (FIG. 3)), which are identified for other developers to use in similar projects (e.g., software development projects where source code is being written, developed, added, deleted, or otherwise modified); in some examples, pull requests can be "pushed" to a software development community or other platform or computing environment.

Referring back to FIG. 8A, a determination is made as to whether logic (e.g., dependency management module 104 (FIG. 1), logic 204 (FIG. 2), self-learning loop module 220 (FIG. 2), ranking algorithm 318 (FIG. 3), or others) detects a pull request has been received (808). If no pull request is received, (i.e., logic such as that described above or as found in application 102 (FIG. 1), application 202 (FIG. 2), application 302 (FIG. 3), or others) monitoring continues for the detection of a completed pull request and process 800 ends (810). Alternatively, if a pull request is received, it may be parsed by smart pull engine 212 (FIG. 2) to identify pull request data associated with previously performed, but similar pull requests (812). Once identified, parsed attributes of a detected pull request may be compared to pull request data retrieved from a repository such as data source 324 (814). In some examples, a determination may be made by comparing pull request data to parsed pull request data (e.g., attributes, characteristics, and other information) of the detected pull request by, for example, self-learning loop module 220 (FIG. 2) (816). If a determination indicates a match or matches are found above a given threshold (which may be determined quantitatively using numerical thresholds or values, or the like), then monitoring is resumed until a pull request is detected (810). However, if a determination indicates a match or matches are found are equal to or below a given threshold (the use of numerical thresholds is an example of a type of comparison that may be performed, but other examples, types, algorithms, software, applications, or other techniques for performing comparisons may be used and are not limited to the examples shown or described), then updated identified within these pull requests are requested from repositories (e.g., update and versions repository 310 (FIG. 3), data source 324 (FIG. 3), or others, without limitation or restriction to type, quantity, configuration, topology, structure, or schema) (818). Upon retrieval, implementations of updates may be performed (820). These updates, if implemented using smart pull techniques such as those described and performed (e.g., by smart pull engine 212 (FIG. 2), automatic implementation of updates (or versions thereof) may be performed without requiring significant developer time. In other words, groups or batches of updates can be performed and committed to source code (e.g., source code 304) by using the above-described process. In other examples, the scope, order, configuration, function, of the elements shown in the described process may be varied, without limitation or restriction.

Figure 8B:
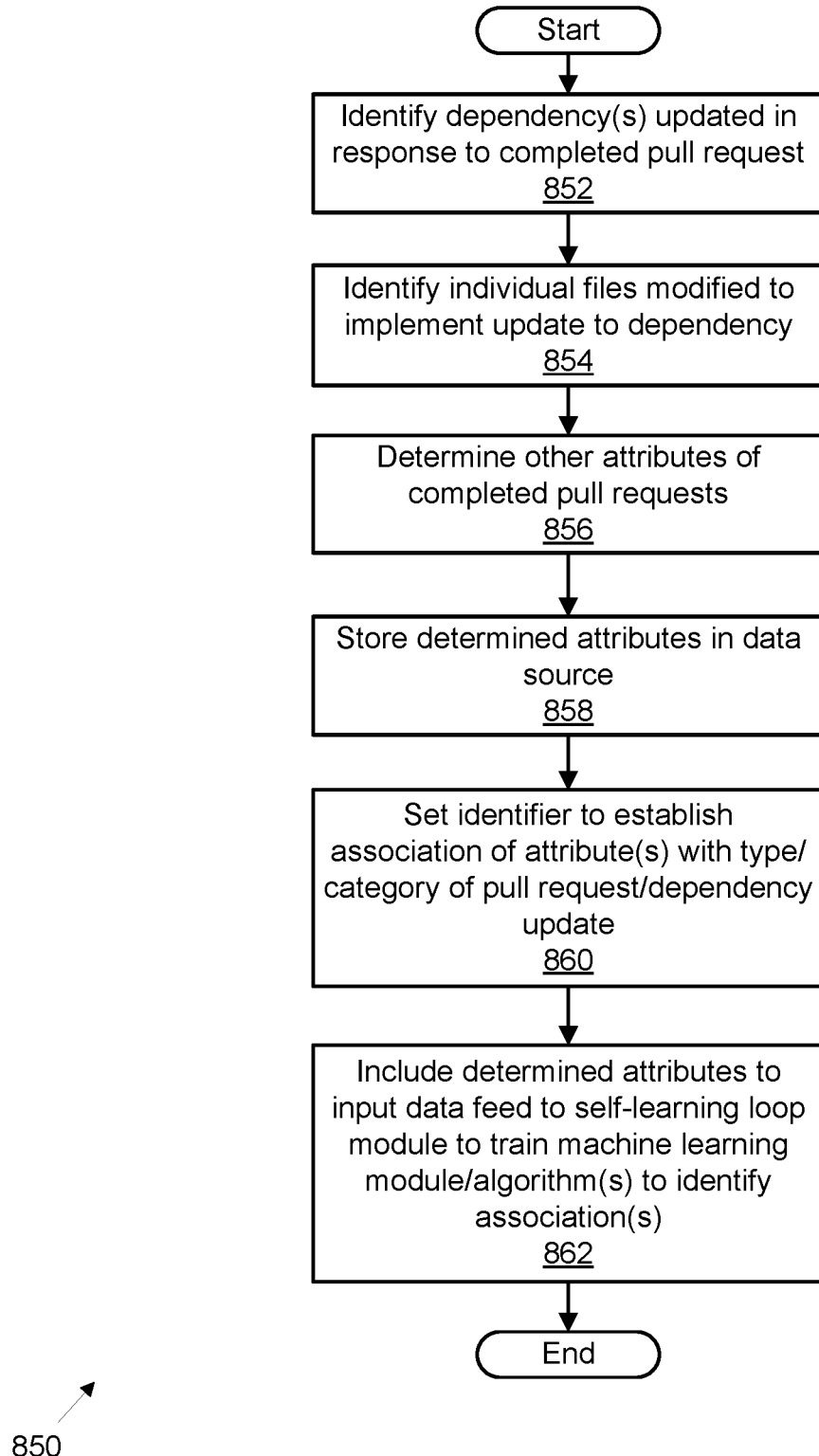
FIG. 8B illustrates an exemplary continuing smart pull process for software dependency management.

FIG. 8B illustrates an exemplary continuing smart pull process for software dependency management. Here, process 850 starts by identifying dependencies that were updated in response to a completed pull request (852). Once identified, individual files are modified to implement an update to a given dependency (854). After completing the update to source code (e.g., source code 304 (FIG. 3)), attributes such as those described above may be determined (856). Once attributes associated with a pull request have been determined, these can be stored in a repository such as data source 324 (FIG. 3) (858). Further, as an exemplary technique for identifying a set of attribute data associated with a given pull request (and updates subsumed within said pull request), an identifier may be set and stored with the pull request data in data source 324 (FIG. 3) (860). In other words, when a pull request is completed, attributes are determined and are stored with an identifier that is configured to identify and associate the pull request with, for example, a type or category of pull requests such that, in future smart pull requests, a previously completed pull request can be identified and associated updates can be retrieved. In other examples, the scope, order, configuration, function, of the elements shown in the described process may be varied, without limitation or restriction.

Figure 9:
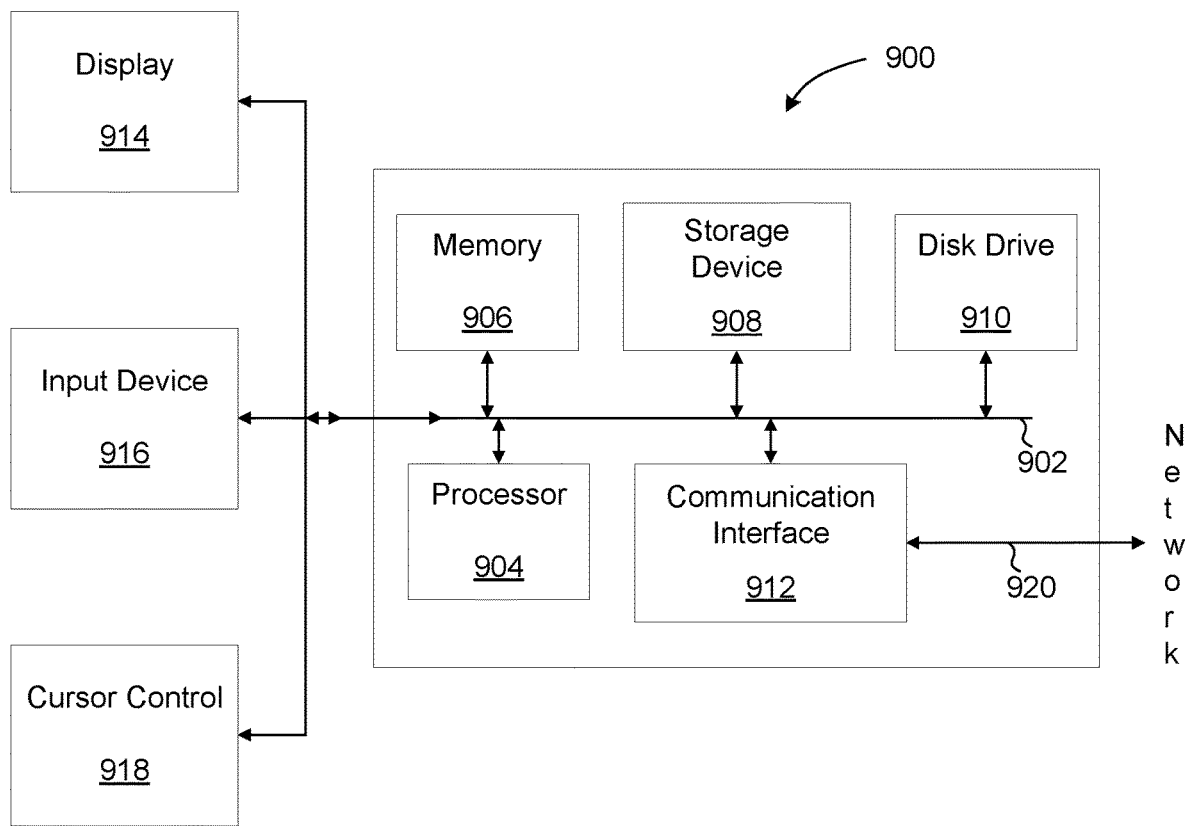
FIG. 9 illustrates an exemplary computing system suitable for software dependency management.

FIG. 9 illustrates an exemplary computing system suitable for software dependency management. In some examples, computer system 900 may be used to implement computer programs, applications, methods, processes, or other software to perform the above-described techniques. Computing system 900 includes a bus 902 or other communication mechanism for communicating information, which interconnects subsystems and devices, such as processor 904, system memory 906 (e.g., RAM), storage device 908 (e.g., ROM), disk drive 910 (e.g., magnetic or optical), communication interface 912 (e.g., modem or Ethernet card), display 914 (e.g., CRT or LCD), input device 916 (e.g., keyboard), cursor control 918 (e.g., mouse or trackball), communication link 920, and network 922.

According to some examples, computing system 800 performs specific operations by processor 904 executing one or more sequences of one or more instructions stored in system memory 906. Such instructions may be read into system memory 906 from another computer readable medium, such as static storage device 908 or disk drive 910. In some examples, hard-wired circuitry may be used in place of or in combination with software instructions for implementation.

The term "computer readable medium" refers to any tangible medium that participates in providing instructions to processor 904 for execution. Such a medium may take many forms, including but not limited to, non-volatile media and volatile media. Non-volatile media includes, for example, optical or magnetic disks, such as disk drive 910. Volatile media includes dynamic memory, such as system memory 906.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 802 for transmitting a computer data signal.

In some examples, execution of the sequences of instructions may be performed by a single computer system 900. According to some examples, two or more computing system 900 coupled by communication link 920 (e.g., LAN, PSTN, or wireless network) may perform the sequence of instructions in coordination with one another. Computing system 900 may transmit and receive messages, data, and instructions, including program, i.e., application code, through communication link 920 and communication interface 912. Received program code may be executed by processor 904 as it is received, and/or stored in disk drive 910, or other non-volatile storage for later execution. In other examples, the above-described techniques may be implemented differently in design, function, and/or structure and are not intended to be limited to the examples described and/or shown in the drawings.

Although the foregoing examples have been described in some detail for purposes of clarity of understanding, the above-described techniques are not limited to the details provided. There are many alternative ways of implementing the above-described invention techniques. The disclosed examples are illustrative and not restrictive.

What is claimed:

1. A method, comprising:
    receiving a query of a repository, the repository being configured to store a file identifying a dependency between an application and an update, the query being configured to request retrieval and implementation of the update with the application, the dependency being associated with a program object model file;
    parsing the query to identify the update and a version of the update configured to modify the application;
    generating automatically a ranking associated with the update and the version using output from a machine-learning module configured to be trained against data received from a data source, the data being associated with a community, and other data retrieved from another data source, the other data being associated with analyzing an issue associated with the update or the version;
    providing a response to the query including displaying the ranking, the data, and the other data;
    searching automatically for code changes performed to implement data representing a project based on evaluation of prior pull requests;
    receiving another query requesting at least one of the update and the version;
    retrieving the at least one of the update and the version; and
    implementing with the application the at least one of the update and the version, the at least one of the update and the version being retrieved and implemented in response to the another query.

2. The method of claim 1, further comprising:
    configuring a user interface to receive the another query after the displaying the ranking, the data, and the other data is performed.

3. The method of claim 1, further comprising:
    retrieving the at least one of the update and the version in response to an input.

4. The method of claim 1, further comprising:
    retrieving the at least one of the update and the version in response to the another query; and
    implementing with the application associated with the dependency the at least one of the update and the version.

5. The method of claim 1, further comprising:
    invoking a self-learning loop module when the query is detected, the self-learning loop module being configured to reference one or more files stored in the data source and the another data source, the one or more files including one or more attributes associated with the update.

6. The method of claim 1, further comprising:
    invoking a self-learning loop module when the query is detected, the self-learning loop module being configured to reference one or more files stored in the data source and the another data source, the one or more files including one or more attributes associated with the version.

7. The method of claim 1, further comprising:
    calling a logic module configured to invoke one or more rules when the query is detected, the one or more rules being associated with the update and the version.

8. The method of claim 1, further comprising:
    a self-learning loop module configured to rank the update and the version based on an error rate associated with implementing the update or the version with the application, the error rate being determined during compilation of source code associated with the application after the update or the version has been implemented.

9. The method of claim 1, wherein the ranking is generated by a ranking module configured to execute one or more ranking algorithms against the update and the version.

10. The method of claim 1, wherein the output comprises further data received from the community, the further data being used to modify the ranking of the update against the version.

11. The method of claim 1, wherein the other data is generated by analyzing the issue, the issue being associated with an implementation of the update before receiving the query.

12. The method of claim 1, wherein the repository is configured to store a file having dependency data associated with the dependency and the application.

13. The method of claim 1, wherein at least one of the one or more attributes is configured to indicate compatibility between the application and the update and the one or more versions.

14. A system, comprising:
    a repository configured to store an update and a version of the update, the update and the version being a dependency of an application; and
    a processor configured to receive a query of the repository, the repository being configured to store a file identifying the dependency between the application, the update, and the version, the query being configured to request retrieval and implementation of the update with the application, the dependency being associated with a program object model file, to parse the query to identify the update and the version of the update configured to modify the application, to generate automatically a ranking associated with the update and the version using output from a machine-learning module configured to be trained against data received from a data source, the data being associated with a community, and other data retrieved from another data source, the other data being associated with analyzing an issue associated with the update or the version, to provide a response to the query including displaying the ranking, the data, and the other data, to search automatically for code changes performed to implement data representing a project based on evaluation of prior pull requests, to receive another query requesting at least one of the update and the version, to retrieve the at least one of the update and the version, and to implement with the application the at least one of the update and the version, the at least one of the update and the version being retrieved and implemented in response to the another query.

15. The system of claim 14, further comprising a ranking module having one or more algorithms configured to rank the update and the version based on further data received from one or more prior implementations of the update.

16. The system of claim 14, wherein the ranking is generated using attributes configured to indicate compatibility between the update, the version, and the application by evaluating an implementation of the update or the version compiled before the query is received.

17. The system of claim 14, wherein the ranking is generated using an attribute configured to indicate compatibility between the update, the version, and the application.

18. The system of claim 14, further comprising a smart pull request module configured to identify the dependency and another dependency, the another dependency invoking another implementation of another update or another version when the update or the version is implemented with the application in response to the another query.

19. The system of claim 14, wherein an attribute is generated by a self-learning loop module by evaluating an implementation of the update or the version to another application that is configured to perform a substantially similar function to the application, the another application also having substantially similar programmatic structure to the application, the attribute being configured to indicate compatibility between the application and the update and the version.

20. A non-transitory computer readable medium having one or more computer program instructions configured to perform a method, the method comprising:
  receiving a query of a repository, the repository being configured to store a file identifying a dependency between an application and an update, the query being configured to request retrieval and implementation of the update with the application, the dependency being associated with a program object model file;
  parsing the query to identify the update and a version of the update configured to modify the application;
  generating automatically a ranking associated with the update and the version using output from a machine-learning module configured to be trained against data received from a data source, the data being associated with a community, and other data retrieved from another data source, the other data being associated with analyzing an issue associated with the update or the version;
  providing a response to the query including displaying the ranking, the data, and the other data;
  searching automatically for code changes performed to implement data representing a project based on evaluation of prior pull requests;
  receiving another query requesting at least one of the update and the version;
  retrieving the at least one of the update and the version; and
  implementing with the application the at least one of the update and the version, the at least one of the update and the version being retrieved and implemented in response to the another query.

* * * * *